US012609800B2

(12) United States Patent
Awad et al.

(10) Patent No.: US 12,609,800 B2
(45) Date of Patent: Apr. 21, 2026

(54) COMMUNICATIONS DEVICE, INFRASTRUCTURE EQUIPMENT AND METHODS

(71) Applicant: Sony Group Corporation, Tokyo (JP)

(72) Inventors: Yassin Aden Awad, Basingstoke (GB); Shin Horng Wong, Basingstoke (GB); Martin Warwick Beale, Basingstoke (GB); Naoki Kusashima, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 318 days.

(21) Appl. No.: 18/270,486

(22) PCT Filed: Dec. 1, 2021

(86) PCT No.: PCT/EP2021/083817
§ 371 (c)(1),
(2) Date: Jun. 30, 2023

(87) PCT Pub. No.: WO2022/148575
PCT Pub. Date: Jul. 14, 2022

(65) Prior Publication Data
US 2024/0056263 A1 Feb. 15, 2024

(30) Foreign Application Priority Data
Jan. 7, 2021 (EP) .................................... 21150624

(51) Int. Cl.
*H04L 5/00* (2006.01)
*H04W 72/54* (2023.01)
(52) U.S. Cl.
CPC .......... *H04L 5/0053* (2013.01); *H04L 5/0094* (2013.01); *H04W 72/54* (2023.01)

(58) Field of Classification Search
CPC .... H04L 5/0053; H04L 5/0094; H04W 72/54; H04W 72/541
See application file for complete search history.

(56) References Cited

U.S. PATENT DOCUMENTS 6,542,736 B1 * 4/2003 Parkvall ................ H04W 28/20
455/452.2
2004/0233927 A1 * 11/2004 Hirosawa ............ H04L 12/4015
370/252
(Continued)

FOREIGN PATENT DOCUMENTS

WO WO-2020164106 A1 * 8/2020 ............ H04W 72/56

OTHER PUBLICATIONS

International Search Report and Written Opinion mailed on Apr. 20, 2022, received for PCT Application PCT/EP2021/083817, filed on Dec. 1, 2021, 10 pages.
(Continued)

*Primary Examiner* — Stephen J Clawson
(74) *Attorney, Agent, or Firm* — XSENSUS LLP

(57) ABSTRACT

A method of transmitting control information, the method comprising selecting third uplink communication resources for the transmission of first control information having a first priority and second control information having a second priority different from the first priority, selecting a first subset of the third uplink communication resources for the transmission of the first control information, selecting a second subset of the third uplink communication resources for the transmission of the second control information, independently encoding the first control information and the second control information, and transmitting to an infrastructure equipment the encoded first control information using the first subset of the third uplink communication resources and the encoded second control information using (Continued)

the second subset of the third uplink communication resources.

20 Claims, 14 Drawing Sheets

(56) References Cited

U.S. PATENT DOCUMENTS

| | | | |
|---|---|---|---|
| 2011/0002309 A1* | 1/2011 | Park | H04L 1/1607 |
| | | | 370/335 |
| 2012/0076204 A1* | 3/2012 | Raveendran | H04N 21/631 |
| | | | 375/E7.021 |
| 2012/0195265 A1* | 8/2012 | Kim | H04L 1/1861 |
| | | | 370/328 |
| 2016/0183244 A1* | 6/2016 | Papasakellariou | H04L 5/001 |
| | | | 370/329 |
| 2019/0045546 A1* | 2/2019 | Li | H04L 5/0073 |
| 2019/0239216 A1 | 8/2019 | Kundu et al. | |
| 2019/0261361 A1* | 8/2019 | Xiong | H04W 72/02 |
| 2020/0205085 A1* | 6/2020 | Li | H04B 7/0696 |

OTHER PUBLICATIONS

Nokia et al., "Enhanced Industrial Internet of Things (IoT) and ultra-reliable and low latency communication (URLLC) support for NR", 3GPP TSG RAN Meeting #88e RP-201310, Jun. 29-Jul. 3, 2020, 6 pages.

3GPP, "NR and NG-RAN Overall Description; Stage 2 (Release 15)", 3GPP TS 38.300 V15.2.0, Jun. 2018, pp. 1-87.

Holma et al., "LTE for UMTS OFDMA and SC-FDMA based radio access", John Wiley and Sons, 2009, 232 pages.

Nokia et al., "Summary of Friday offline discussion on UL/DL intra-UE prioritization/multiplexing", 3GPP TSG-RAN WG1 #96, R1-1903818, Feb. 25-Mar. 1, 2019, 29 pages.

Nokia et al., "Study on NR Industrial Internet of Things (IoT)", 3GPP TSG RAN meeting #81, RP-182090, Sep. 10-13, 2018, 5 pages.

Huawei et al., "Physical Layer Enhancements for NR Ultra-Reliable and Low Latency Communication (URLLC)", 3GPP TSG RAN Meeting #83, RP-190726, Mar. 18-21, 2019, 5 pages.

3GPP, "Study on NR Industrial Internet of Things (IoT); (Release 16)", 3GPP TR 38.825 V16.0.0, Mar. 2019, pp. 1-33.

3GPP, "Study on Scenarios and Requirements for Next Generation Access Technologies; (Release 14)", 3GPP TR 38.913 V14.3.0, Jun. 2017, pp. 1-39.

* cited by examiner

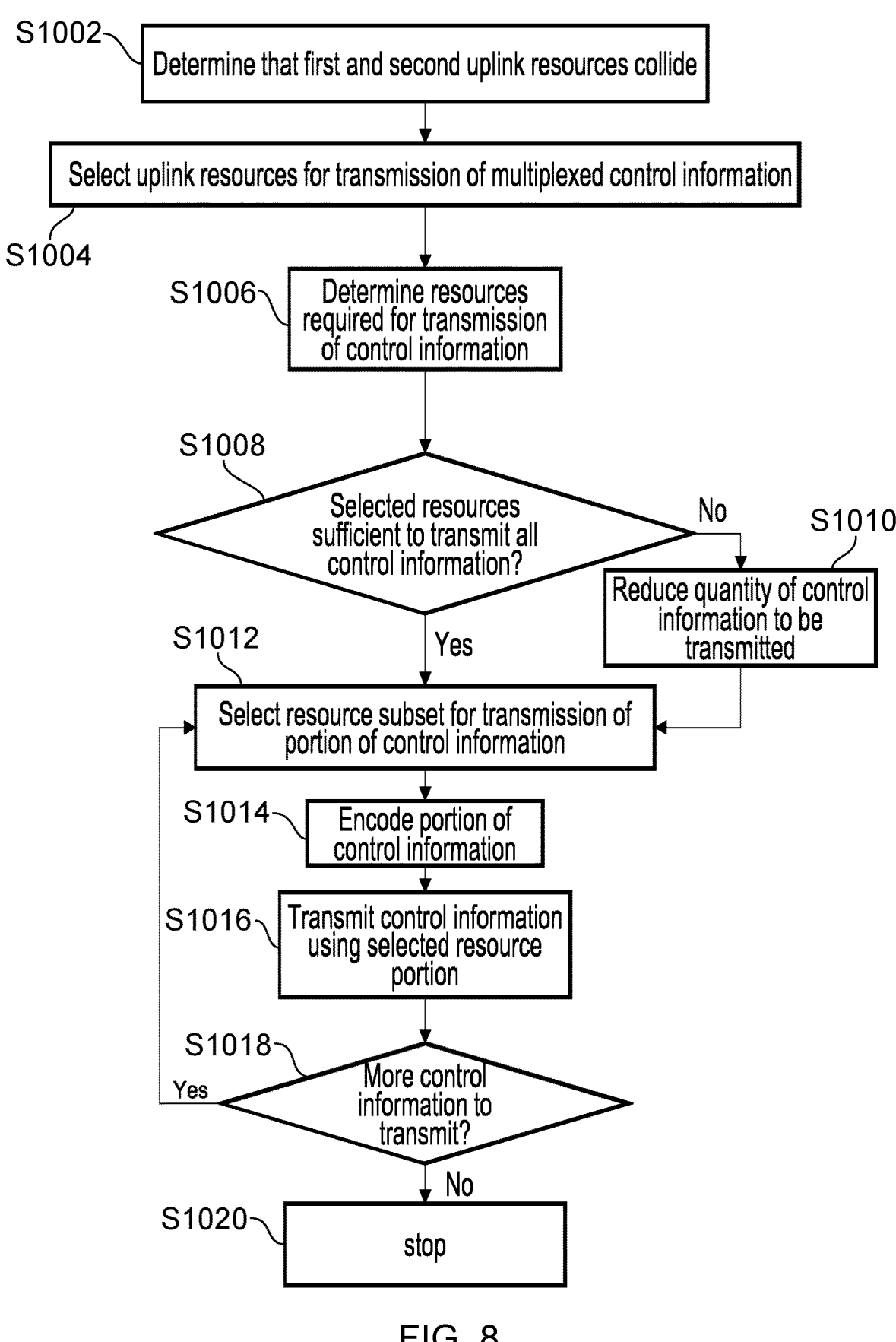

S1002 — Determine that first and second uplink resources collide

S1004 — Select uplink resources for transmission of multiplexed control information S1006 — Determine resources required for transmission of control information S1008 — Selected resources sufficient to transmit all control information?

No — S1010 — Reduce quantity of control information to be transmitted

Yes

S1012 — Select resource subset for transmission of portion of control information S1014 — Encode portion of control information S1016 — Transmit control information using selected resource portion S1018 — More control information to transmit?

Yes

No

S1020 — stop

FIG. 8

COMMUNICATIONS DEVICE, INFRASTRUCTURE EQUIPMENT AND METHODS

CROSS-REFERENCE TO RELATED APPLICATIONS

The present application is based on PCT filing PCT/EP2021/083817, filed Dec. 1, 2021, which claims priority to European Patent Application No. 21150624.1, filed Jan. 7, 2021; the entire contents of each are incorporated herein by reference.

BACKGROUND

Field

The present disclosure relates to communications devices, infrastructure equipment and methods for the transmission of control information in a wireless communications network.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to support communications routinely and efficiently with a wider range of devices associated with a wider range of data traffic profiles and types than current systems are optimised to support. For example, it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

In view of this there is expected to be a desire for future wireless communications networks, for example those which may be referred to as 5G or new radio (NR) system/ new radio access technology (RAT) systems [1], as well as future iterations/releases of existing systems, to efficiently support connectivity for a wide range of devices associated with different applications and different characteristic data traffic profiles.

Although most conventional services are provided by means of unicast data transmissions, many services may be more suited to the use of multicast or broadcast transmission. The provision of such services gives rise to new challenges for efficiently handling communications in wireless telecommunications systems that need to be addressed.

SUMMARY

The present disclosure can help address or mitigate at least some of the issues discussed above.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and:

FIG. 8 is a process flow chart for a method performed by a communications device in accordance with embodiments of the present technique;

DETAILED DESCRIPTION OF THE EMBODIMENTS

Long Term Evolution Advanced Radio Access Technology (4G)

Figure 1:
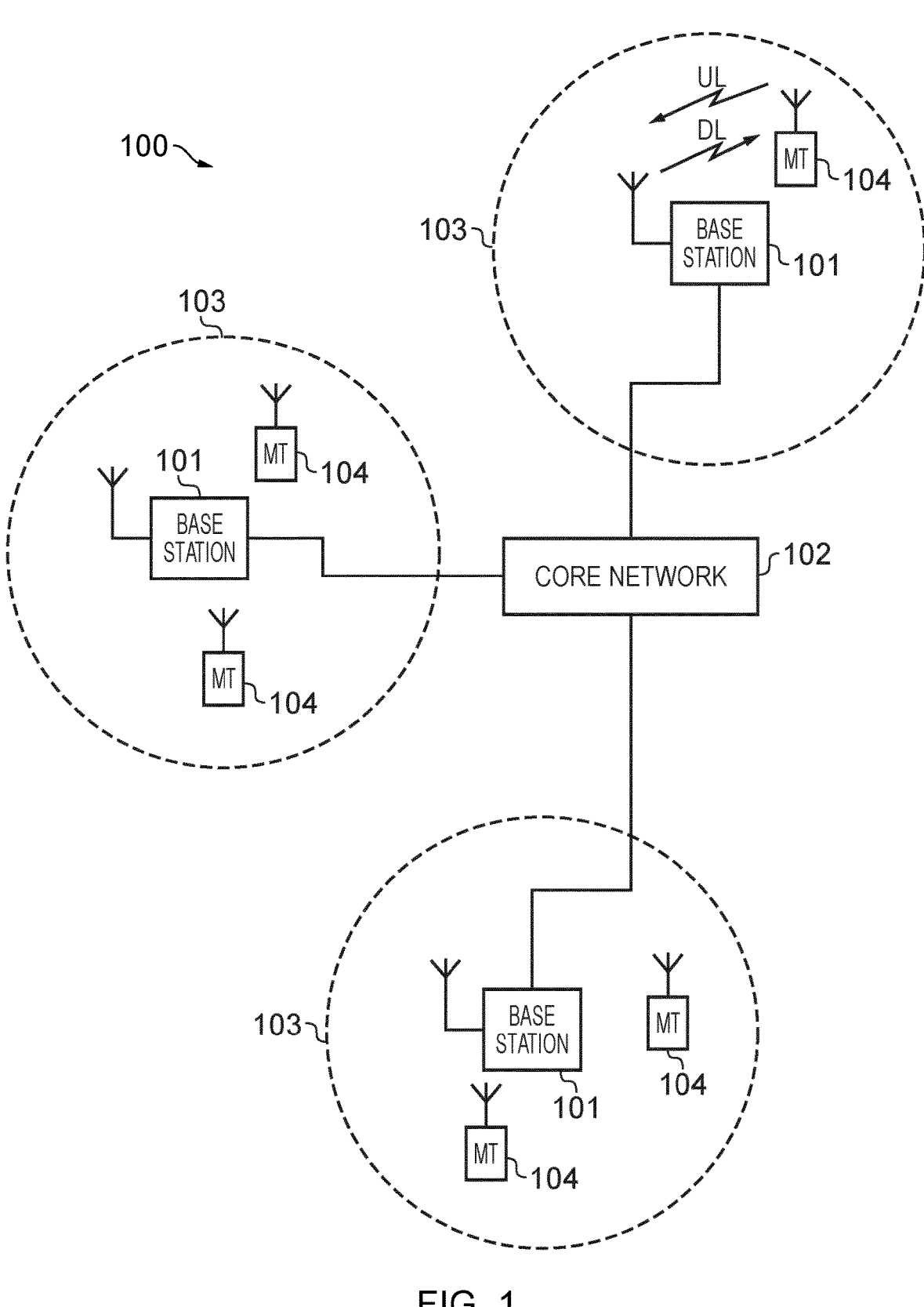
FIG. 1 schematically represents some aspects of an LTE-type wireless telecommunication system which may be configured to operate in accordance with certain embodiments of the present disclosure.

FIG. 1 provides a schematic diagram illustrating some basic functionality of a mobile telecommunications network/system 100 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP® body, and also described in many books on the subject, for example, Holma H. and Toskala A [2]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 100 includes a plurality of base stations 101 connected to a core network part 102. Each base station provides a coverage area 103 (e.g. a cell) within which data can be communicated to and from communications devices 104. Data is transmitted from the base stations 101 to the communications devices 104 within their respective coverage areas 103 via a radio downlink. Data is transmitted from the communications devices 104 to the base stations 101 via a radio uplink. The core network part 102 routes data to and from the communications devices 104 via the respective base stations 101 and provides functions such as authentication, mobility management, charging and so on. Communications devices may also be referred to as mobile stations, user equipment (UE), user terminals, mobile radios, terminal devices, and so forth. Base stations, which are an example of network infrastructure equipment/network access nodes, may also be referred to as transceiver stations/nodeBs/e-nodeBs, g-nodeBs (gNB) and so forth. In this regard different terminology is often associated with different generations of wireless telecommunications systems for elements providing broadly comparable functionality. However, example embodiments of the disclosure may be equally implemented in different generations of wireless telecommunications systems such as 5G or new radio as explained below, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

Figure 2:
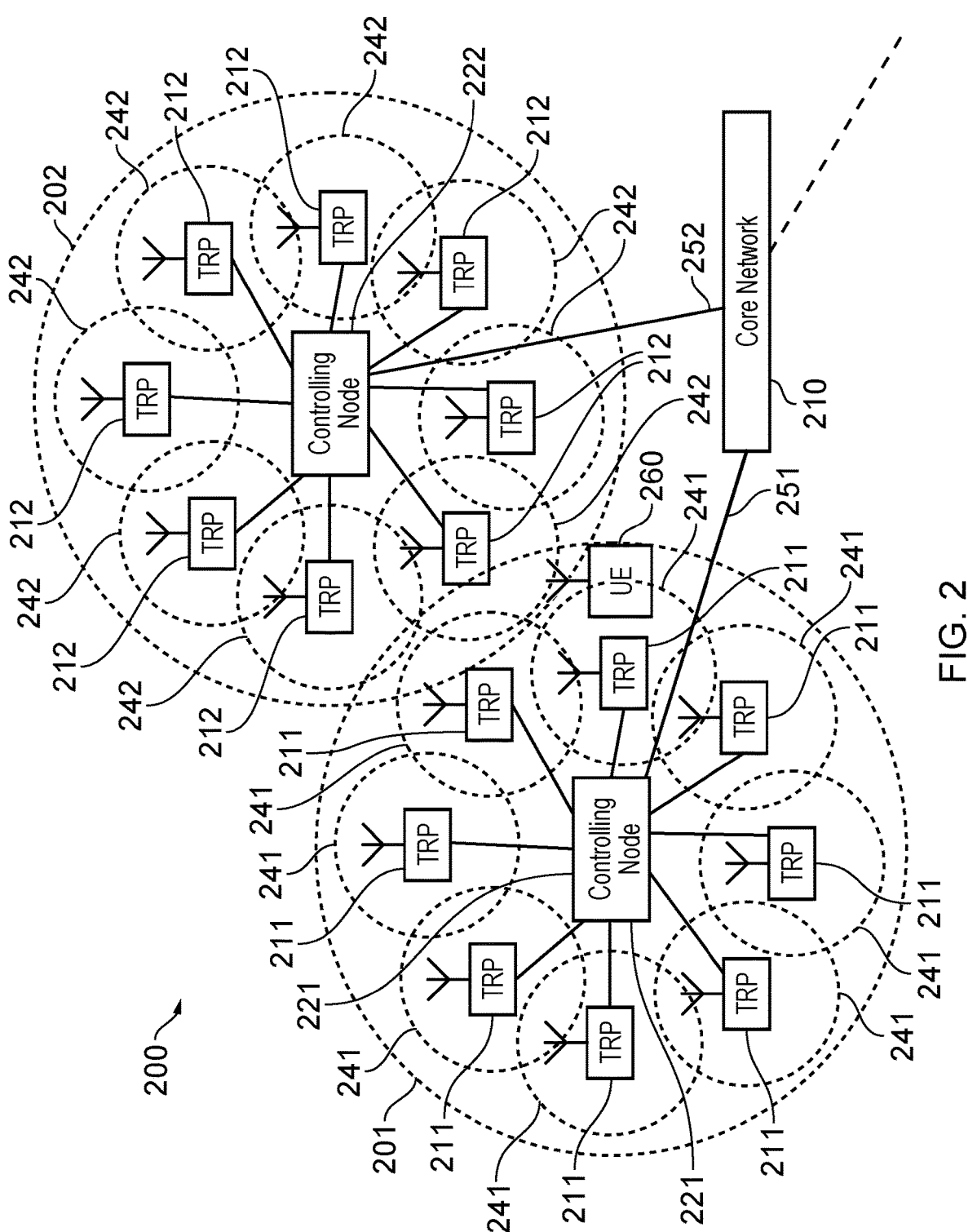
FIG. 2 schematically represents some aspects of a new radio access technology (RAT) wireless telecommunications system which may be configured to operate in accordance with certain embodiments of the present disclosure.

FIG. 2 is a schematic diagram illustrating a network architecture for a new RAT wireless communications network/system 200 based on previously proposed approaches which may also be adapted to provide functionality in accordance with embodiments of the disclosure described herein. The new RAT network 200 represented in FIG. 2 comprises a first communication cell 201 and a second communication cell 202. Each communication cell 201, 202, comprises a controlling node (centralised unit) 221, 222 in communication with a core network component 210 over a respective wired or wireless link 251, 252. The respective controlling nodes 221, 222 are also each in communication with a plurality of distributed units (radio access nodes/remote transmission and reception points (TRPs)) 211, 212 in their respective cells. Again, these communications may be over respective wired or wireless links. The distributed units 211, 212 are responsible for providing the radio access interface for communications devices connected to the network. Each distributed unit 211, 212 has a coverage area (radio access footprint) 241, 242 where the sum of the coverage areas of the distributed units under the control of a controlling node together define the coverage of the respective communication cells 201, 202. Each distributed unit 211, 212 includes transceiver circuitry for transmission and reception of wireless signals and processor circuitry configured to control the respective distributed units 211, 212.

In terms of broad top-level functionality, the core network component 210 of the new RAT communications network represented in FIG. 2 may be broadly considered to correspond with the core network 102 represented in FIG. 1, and the respective controlling nodes 221, 222 and their associated distributed units/TRPs 211, 212 may be broadly considered to provide functionality corresponding to the base stations 101 of FIG. 1. The term network infrastructure equipment/access node may be used to encompass these elements and more conventional base station type elements of wireless communications systems. Depending on the application at hand the responsibility for scheduling transmissions which are scheduled on the radio interface between the respective distributed units and the communications devices may lie with the controlling node/centralised unit and/or the distributed units/TRPs.

A communications device or UE 260 is represented in FIG. 2 within the coverage area of the first communication cell 201. This communications device 260 may thus exchange signalling with the first controlling node 221 in the first communication cell via one of the distributed units 211 associated with the first communication cell 201. In some cases, communications for a given communications device are routed through only one of the distributed units, but it will be appreciated in some other implementations communications associated with a given communications device may be routed through more than one distributed unit, for example in a soft handover scenario and other scenarios.

In the example of FIG. 2, two communication cells 201, 202 and one communications device 260 are shown for simplicity, but it will of course be appreciated that in practice the system may comprise a larger number of communication cells (each supported by a respective controlling node and plurality of distributed units) serving a larger number of communications devices.

It will further be appreciated that FIG. 2 represents merely one example of a proposed architecture for a new RAT communications system in which approaches in accordance with the principles described herein may be adopted, and the functionality disclosed herein may also be applied in respect of wireless communications systems having different architectures.

Thus example embodiments of the disclosure as discussed herein may be implemented in wireless telecommunication systems/networks according to various different architectures, such as the example architectures shown in FIGS. 1 and 2. It will thus be appreciated the specific wireless communications architecture in any given implementation is not of primary significance to the principles described herein.

In this regard, example embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/access node may comprise a base station, such as an LTE-type base station 101 as shown in FIG. 1 which is adapted to provide functionality in accordance with the principles described herein, and in other examples the network infrastructure equipment/access node may comprise a control unit/controlling node 221, 222 and/or a TRP 211, 212 of the kind shown in FIG. 2 which is adapted to provide functionality in accordance with the principles described herein.

Figure 3:
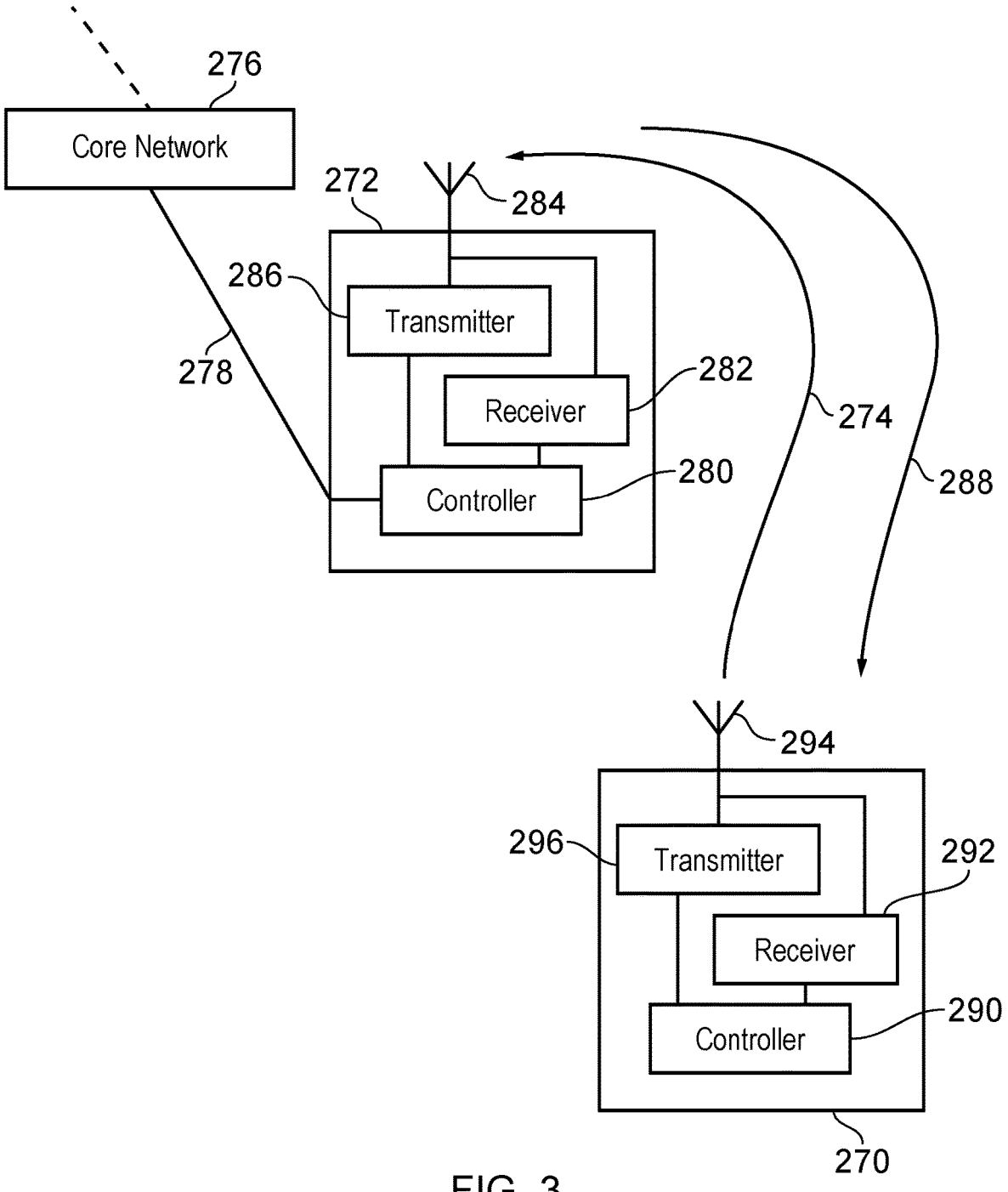
FIG. 3 is a schematic block diagram of an example infrastructure equipment and communications device configured in accordance with example embodiments.

A more detailed illustration of a communications device 270 and an example network infrastructure equipment 272, which may be thought of as a gNB 101 or a combination of a controlling node 221 and TRP 211, is presented in FIG. 3. As shown in FIG. 3, the communications device 270 is shown to transmit uplink data to the infrastructure equipment 272 of a wireless access interface as illustrated generally by an arrow 274. The UE 270 is shown to receive downlink data transmitted by the infrastructure equipment 272 via resources of the wireless access interface as illustrated generally by an arrow 288. As with FIGS. 1 and 2, the infrastructure equipment 272 is connected to a core network 276 (which may correspond to the core network 102 of FIG. 1 or the core network 210 of FIG. 2) via an interface 278 to a controller 280 of the infrastructure equipment 272. The infrastructure equipment 272 may additionally be connected to other similar infrastructure equipment by means of an inter-radio access network node interface, not shown on FIG. 3.

The infrastructure equipment 272 includes a receiver 282 connected to an antenna 284 and a transmitter 286 connected to the antenna 284. Correspondingly, the communications device 270 includes a controller 290 connected to a receiver 292 which receives signals from an antenna 294 and a transmitter 296 also connected to the antenna 294.

The controller 280 is configured to control the infrastructure equipment 272 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 280 may comprise circuitry which is suitably configured/programmed to provide the desired functionality using conventional programming/configuration techniques for equipment in wireless telecommunications systems. The transmitter 286 and the receiver 282 may comprise signal processing and radio frequency filters, amplifiers and circuitry in accordance with conventional arrangements. The transmitter 286, the receiver 282 and the controller 280 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the infrastructure equipment 272 will in general comprise various other elements associated with its operating functionality.

Correspondingly, the controller 290 of the communications device 270 is configured to control the transmitter 296 and the receiver 292 and may comprise processor circuitry which may in turn comprise various sub-units/sub-circuits for providing functionality as explained further herein. These sub-units may be implemented as discrete hardware elements or as appropriately configured functions of the processor circuitry. Thus, the controller 290 may comprise circuitry which is suitably configured/programmed to provide the desired functionality using conventional programming/configuration techniques for equipment in wireless telecommunications systems. Likewise, the transmitter 296 and the receiver 292 may comprise signal processing and radio frequency filters, amplifiers and circuitry in accordance with conventional arrangements. The transmitter 296, receiver 292 and controller 290 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the communications device 270 will in general comprise various other elements associated with its operating functionality, for example a power source, user interface, and so forth, but these are not shown in FIG. 3 in the interests of simplicity.

The controllers 280, 290 may be configured to carry out instructions which are stored on a computer readable medium, such as a non-volatile memory. The processing steps described herein may be carried out by, for example, a microprocessor in conjunction with a random-access memory, which may be non-volatile memory, operating according to instructions stored on a computer readable medium.

Two of the services defined in 5G are the Ultra-Reliable and Low Latency Communications (URLLC) and the enhanced Mobile BroadBand (eMBB) services. URLLC has very low latency and high reliability where a URLLC data packet (e.g. 32 bytes) is required to be transmitted from the radio protocol layer 2/3 SDU ingress point to the radio protocol layer 2/3 SDU egress point of the radio interface within 1 ms with a reliability of 99.999% [3] to 99.9999%. On the other hand, eMBB requires high data rate, e.g. 20 Gbps with moderate latency and reliability (e.g. 99% to 99.9%).

3GPP has recently completed a Rel-16 Work Item (WI) on eURLLC [4] which specifies features for high reliability and low latency services such as factory automation, transport industry, electrical power distribution, etc. in a 5G system. The eURLLC feature is further enhanced in a new Rel-17 WI [5] where one of the objectives is to allow multiplexing of Uplink Control Information (UCI) from two colliding uplink transmissions of different Layer 1 priority.

Where communication resources are allocated by means of a dynamic grant, downlink control information is transmitted to the communications device to indicate the allocated communication resources and parameters for determining the uplink resources for transmitting acknowledgement information indicating whether the data transmitted using the allocated resources had been correctly received or not.

The uplink resources for transmitting acknowledgement information may be allocated on a physical uplink control channel (PUCCH).

The same PUCCH resources may be used for the transmission of acknowledgement information associated with multiple downlink transmissions.

Figure 4:
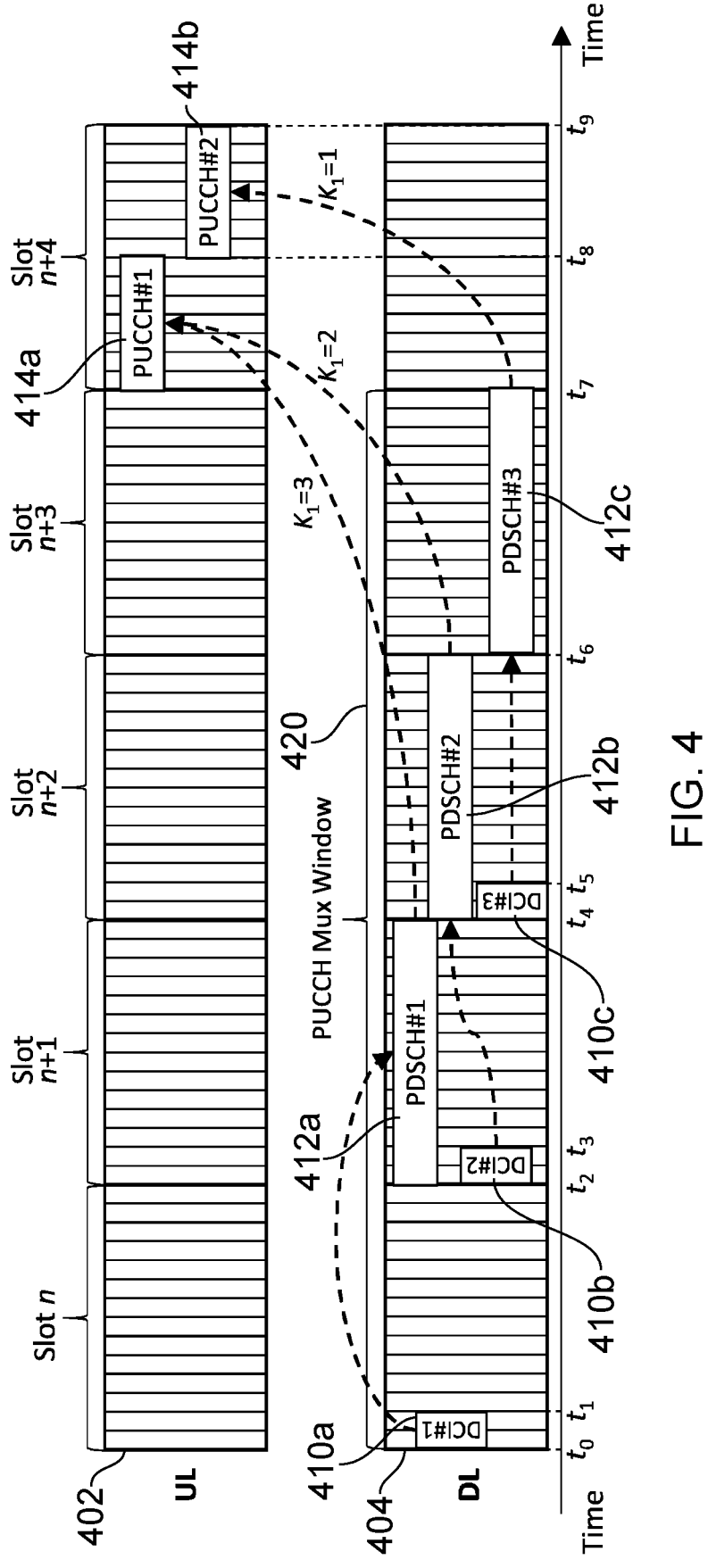
FIG. 4 illustrates the transmission of acknowledgement information associated with downlink transmissions, where the downlink transmissions use dynamically allocated communication resources, in accordance with conventional techniques.

FIG. 4 illustrates the transmission of acknowledgement information associated with downlink transmissions, where the downlink transmissions use dynamically allocated communication resources, in accordance with conventional techniques.

In FIG. 4, time progresses from left to right. Communications resources of a wireless access interface are shown, comprising downlink resources 404 and uplink resources 402. The uplink transmission 274 of FIG. 3 may be an example of a transmission using uplink resources 402. The downlink transmission 288 of FIG. 3 may be an example of a transmission using downlink resources 404. In the time domain, the communication resources are divided into timeslots (n, n+1, etc.), each timeslot comprising symbol periods. In the example of FIG. 4, each timeslot contains 14 symbol periods.

Downlink control information (DCI) 410a, 410b, 410c allocates corresponding downlink communication resources 412a, 412b, 412c. The downlink communication resources 412a, 412b, 412c are used for the transmission of data on physical downlink shared channels (PDSCH).

Each DCI comprises an indication of a value of a parameter K1. The K1 parameter indicates a timeslot offset between a timeslot in which the downlink PDSCH resources 412a, 412b, 412c end and a timeslot in which communication resources are allocated for the transmission of associated acknowledgement information. For example, the value of K1 may be indicated in a "PDSCH-to-HARQ_feedback timing indicator" field of the DL Grant. The downlink grant may be encoded in accordance with a conventional DCI format, such as a DCI Format 1_0, DCI Format 1_1 or DCI Format 1_2.

In the example of FIG. 4, a first DCI 410a in slot n allocates first communication resources 412a which begin and end in slot n+1, and indicates a K1 value of 3. Accordingly, the acknowledgment information associated with the downlink transmission (i.e. indicating whether the data transmitted via the first communication resources 412a were correctly received and decoded) is to be transmitted in slot n+1+K1=n+4. Similarly, second and third DCIs 410b, 410c, allocate respective second and third communication resources 412b, 412c, starting and ending in timeslots n+2 and n+3 respectively and indicate K1 values of 2 and 1, respectively. Accordingly, a communications device is able to determine that acknowledgment information associated with the second and third downlink transmissions in second and third communication resources 412b, 412c is also to be transmitted in slot n+4.

In accordance with conventional techniques, acknowledgement information may be transmitted as part of a hybrid automatic repeat-request acknowledgement (HARQ) process.

In the present disclosure, the term 'HARQ-ACK' (hybrid automatic repeat-request acknowledgement) is used to refer to a portion of acknowledgement information indicating whether data transmitted via a single instance of downlink communication resources has been correctly received and decoded. It will be appreciated that the techniques disclosed herein are applicable when acknowledged data transmission is carried out other than by means of a HARQ technique. In the example of FIG. 4, there may be three separate HARQ-ACKs, one each associated with the first to third downlink communication resources 412a, 412b, 412c. Where no multiplexing is carried out (as described further below), a HARQ-ACK may comprise acknowledgement information which would have been sent using a single instance of allocated PUCCH resources.

The PUCCH resources within a timeslot may be indicated in a "PUCCH Resource Indicator" (PRI) field in the DL Grant. In the example of FIG. 4, the first and second DCIs 410a, 410b indicate first PUCCH resources 414a. The third DCI 410c indicates second PUCCH resources 414b.

In accordance with conventional techniques, such as those standardised in 3GPP Release 15, a communications device is permitted to transmit HARQ-ACKs using at most one PUCCH resource within any given timeslot, even if it has been allocated multiple PUCCH resources which do not overlap in time. (This constraint may not apply to the use of further PUCCH resources for other purposes, such as transmitting a scheduling request).

The communications device may resolve this constraint by multiplexing the HARQ-ACKs, such that they may be sent using a single PUCCH resource instance. That is, the single PUCCH resource instance is used to transmit the multiple HARQ-ACKs. Multiplexing may comprise combining the HARQ-ACKs in a manner suitable for transmission using the single PUCCH resource instance. For example, this may comprise concatenating the acknowledgement information of the HARQ-ACKs.

A multiplexing window may be defined, whereby HARQ-ACKs may be multiplexed together only if they relate to downlink communications which occur within the multiplexing window. In the example of FIG. 4, the PUCCH multiplexing window 420 extends from, and includes slot n to slot n+3. Because each of the first to third downlink communication resources 412a, 412b, 412c are within the multiplexing window 420, the communications device is permitted to multiplex its corresponding HARQ-ACKs.

The communications device may select the PUCCH resources based on the PRI indicated by the last (i.e. most recently received) DCI which allocated downlink communication resources within the multiplexing window.

Accordingly, in the example of FIG. 4, the communications device selects the second PUCCH resources 414b, generates a multiplexed HARQ-ACK, based on the three HARQ-ACKs associated with the first to third downlink communication resources 412a, 412b, 412c, and transmits the multiplexed HARQ-ACK using the second PUCCH resources 414b within timeslot n+4 since the second PUCCH resource 414b is associated to the last DCI 410c in the multiplexing window.

In accordance with conventional techniques, such as those standardised in 3GPP Release 16, the time domain may be further divided into sub-slots, where each timeslot contains a number (such as 2 or 7) of sub-slots. A communications device may be permitted to transmit HARQ-ACKs using more than one PUCCH resource within a timeslot, if the PUCCH resources occur within different sub-slots. A K1 value indicated by a DCI may accordingly indicate a sub-slot in which a HARQ-ACK is to be transmitted.

Figure 5:
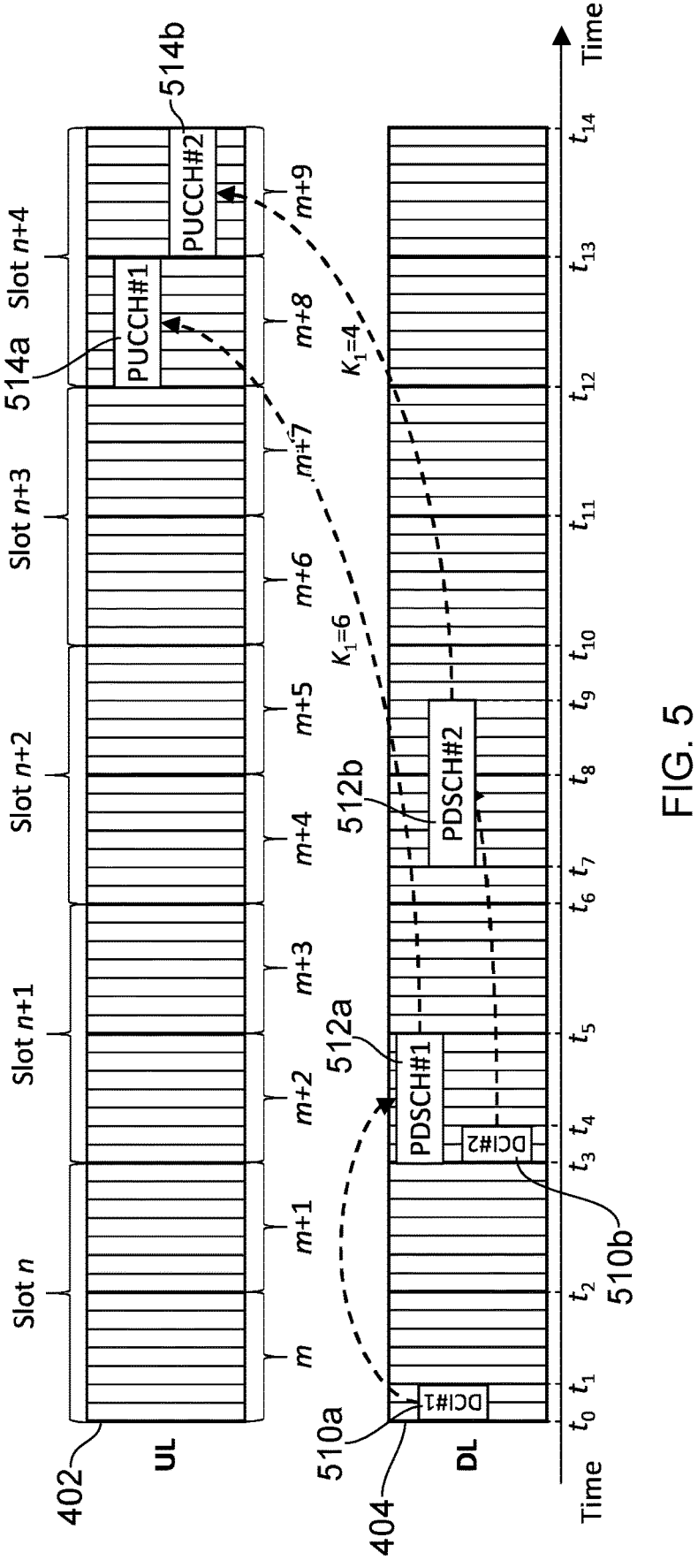
FIG. 5 illustrates the transmission of acknowledgement information associated with downlink transmissions of eURLLC data, where resources for the transmission of the acknowledgement information are allocated within a sub-slot, in accordance with conventional techniques.

FIG. 5 illustrates the transmission of acknowledgement information associated with downlink transmissions of eURLLC data, where resources for the transmission of the acknowledgement information are allocated within a sub-slot, in accordance with conventional techniques.

In the example of FIG. 5, there are two sub-slots, each of 7 symbol periods in duration, within each slot. The sub-slots are labelled m, m+1, m+2, etc.

The first DCI 510a allocates first downlink communication resources 512a and indicates that K1 has a value of 6. Because the first downlink communication resources 512a end in sub-slot m+2, the first HARQ-ACK is to be transmitted in first PUCCH resources 514a in sub-slot m+2+6=m+8. Similarly, the second DCI 510b allocates second downlink communication resources 512b and indicates that K1 has a value of 4. Because the second downlink communication resources 512b end in sub-slot m+5, the second HARQ-ACK is to be transmitted in second PUCCH resources 514b in sub-slot m+5+4=m+9. Because the first and second PUCCH resources 514a, 514b are in different sub-slots, the communications device is permitted to (and indeed, does) transmit respective HARQ-ACKs using the first and second PUCCH resources 514a, 514b.

Conventionally, semi-persistent scheduling (SPS) comprises the allocation of periodic communication resource instances for the transmission of data to, or by, a particular communications device. An indication of an SPS allocation may be transmitted using RRC configuration signalling. An SPS allocation may be subsequently activated or deactivated.

When activated, each instance (referred to herein as an SPS instance) of the SPS allocation is pre-allocated, and there is no need for a separate downlink grant to be transmitted for each instance. SPS can therefore permit efficient use of communication resources when data is to be transmitted periodically, and/or with very low latency and reduced control overhead.

A communications device or infrastructure equipment may not be required to transmit using every allocated SPS instance. However, in accordance with conventional techniques, a communications device may be required to transmit acknowledgement information in respect of each downlink SPS instance allocated for the transmission of data to the communications device, regardless of whether or not any such transmission occurred.

A particular downlink SPS allocation may allocate resources on a physical downlink shared channel (PDSCH), and accordingly, such an allocation and the corresponding sequence of SPS instances is referred to herein as an SPS PDSCH. It will be appreciated, however, that an SPS allocation may allocate resources on other channels.

In accordance with conventional techniques such as those specified in 3GPP Release 15 specifications, a communications device can be configured with at most one SPS PDSCH. After configuration, the SPS PDSCH may be activated by the transmission of an activation DCI by the infrastructure equipment to the communications device. An activation DCI may be encoded in accordance with a conventional DCI Format 1_0 or DCI Format 1_1. The SPS PDSCH may be deactivated by the transmission of a deactivation DCI by the infrastructure equipment to the communications device. A cyclic redundancy check (CRC) of an activation DCI and a deactivation DCI may be scrambled with an identifier associated with the SPS PDSCH, such as a CS radio network temporary identity (CS-RNTI).

The communications device may be required to transmit acknowledgement information to confirm the receipt of a deactivation DCI. On the other hand, no acknowledgement information may be required to confirm the receipt of an activation DCI.

The activation DCI may comprise a PDSCH-to-HARQ_feedback timing indicator which indicates the value of K1 for each subsequent instance of the SPS PDSCH, until the SPS PDSCH is deactivated. The K1 value applicable to instances of the SPS PDSCH can only be changed by deactivating, and subsequently activating, the SPS PDSCH, the subsequent activation being by means of a further activation DCI comprising an indication of the updated K1 value.

In accordance with the 3GPP Release 15 specifications, because a communications device can be configured with at most one SPS PDSCH, PUCCH formats which can carry at most 2 HARQ-ACKs (such as a PUCCH format 0 or a PUCCH format 1) may be used for the transmission of acknowledgement information associated with an SPS PDSCH instance. If it would not be possible to transmit the acknowledgement information (HARQ-ACK) because of a collision with a PUCCH allocation for the transmission of a HARQ-ACK associated with a PDSCH transmission which was dynamically granted (a "DG-PDSCH"), the SPS HARQ-ACK may be multiplexed with the conflicting HARQ-ACK, and transmitted using the PUCCH allocation for the transmission of a HARQ-ACK associated with the DG-PDSCH.

In accordance with conventional techniques such as those specified in 3GPP Release 16 specifications, a communications device can be configured with at most eight SPS PDSCHs. Each SPS PDSCH may be associated with an SPS Configuration Index, the mapping between SPS Configuration Index and SPS PDSCH being indicated by RRC configuration signalling.

Each SPS PDSCH may be individually activated using an activation DCI, the activation DCI comprising an indication of the associated SPS Configuration Index and an indication of the K1 value for that SPS PDSCH. Multiple SPS PDSCHs may be deactivated using a single deactivation DCI. As in Release 15, activation DCIs and deactivation DCIs may have their CRC scrambled with the CS-RNTI, and acknowledgment information is required to be transmitted only in response to receiving a deactivation DCI.

It may be the case that multiple HARQ-ACKs corresponding to different SPS PDSCH instances are to be sent within a same slot or sub-slot, based on the timing of the SPS PDSCH instances and the associated K1 values. In particular, the K1 values may be different for different SPS PDSCHs.

In such a scenario, the communications device may multiplex the conflicting HARQ-ACKs such that they may be transmitted using a single PUCCH instance. To allow such multiplexing, PUCCH Formats 2, 3, and 4 may be used (in addition to PUCCH Formats 0 and 1).

The ordering of the HARQ-ACKs in the multiplexed transmission may be in accordance with a predetermined sequence. For example, the order of the HARQ-ACKs may be based on the SPS PDSCH Configuration index of the corresponding SPS PDSCH instances, and (where multiple HARQ-ACKs are associated with the same SPS PDSCH) based on the slot in which the corresponding SPS PDSCH instances occurred. Since the K1 value may be fixed per SPS PDSCH, then it is unlikely that HARQ-ACKs associated with two or more SPS PDSCH having the same index would be multiplexed into a single PUCCH transmission.

Figure 6:
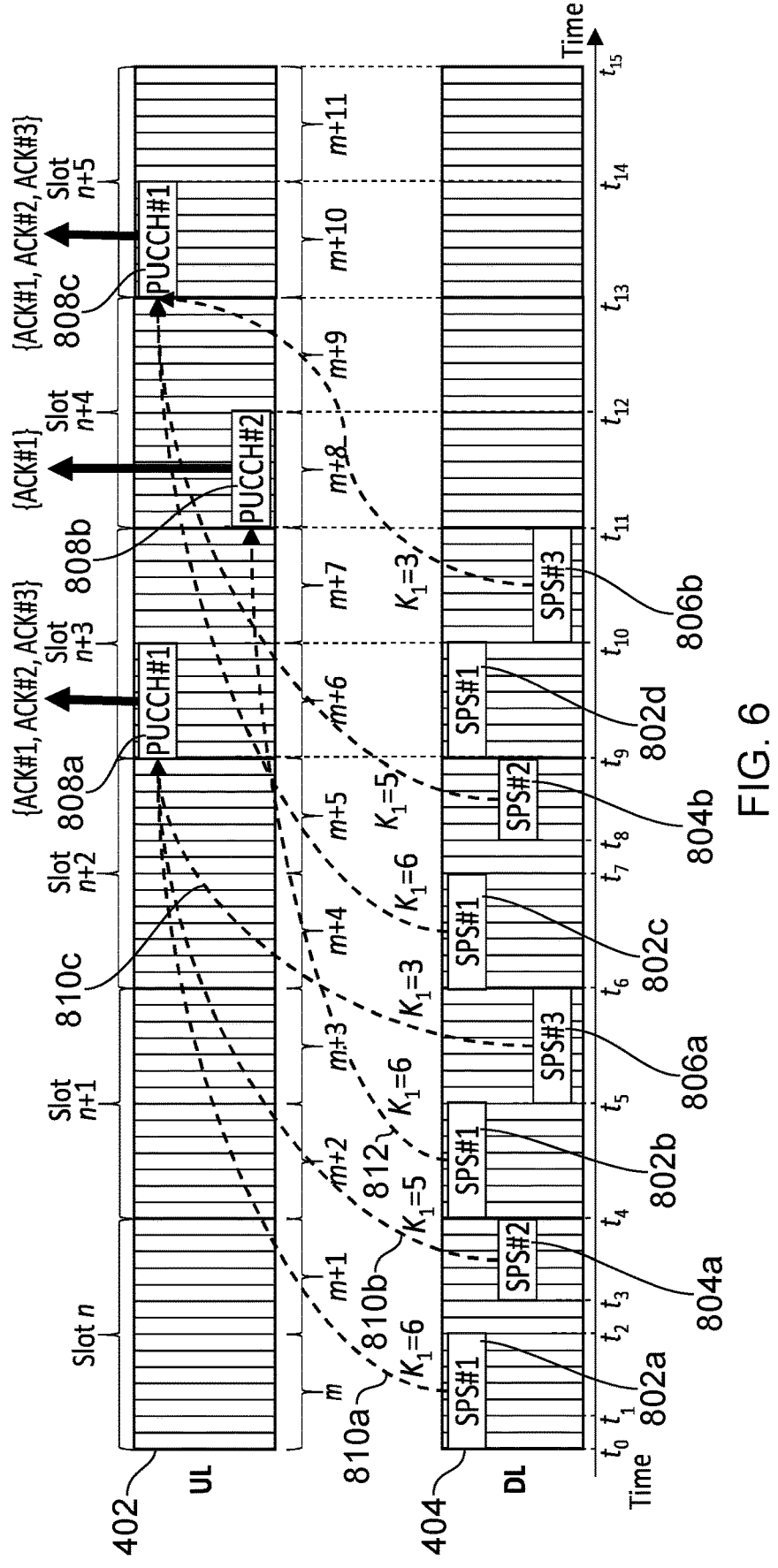
FIG. 6 shows the multiplexing of acknowledgement information, associated with data transmitted using respective downlink instances of communication resources, within a single instance of uplink control channel resources, in accordance with conventional techniques.

FIG. 6 shows the multiplexing of multiple HARQ-ACKs associated with respective SPS PDSCH instances within a single PUCCH instance, in accordance with conventional techniques.

FIG. 6 shows SPS instances associated with three SPS PDSCHs, and three PUCCH instances.

Four instances 802*a*, 802*b*, 802*c*, 802*d* of a first SPS PDSCH having a K1 value of 6 are shown. Two instances 804*a*, 804*b* of a second SPS PDSCH having a K1 value of 5 are shown. Two instances 806*a*, 806*b* of a third SPS PDSCH having a K1 value of 3 are also shown. No SPS PDSCH instances occur prior to slot n; for example, each of the first to third SPS PDSCHs may have been activated such that their first instance occurred during, or after, slot n.

Based on the K1 values of the associated SPS PDSCHs, PUCCH resources (such as the first PUCCH resources 808*a*) are allocated in slot n+3 for the transmission of HARQ-ACKs associated with the first instance 802*a* of the first SPS PDSCH (which occurs in slot n)

the first instance 804*a* of the second SPS PDSCH (which occurs in slot n), and the first instance 806*a* of the third SPS PDSCH (which occurs in slot n+1).

HARQ-ACKs for each of these three instances are therefore multiplexed and transmitted using the first PUCCH resources 808*a*, as indicated by the dashed arrows 810*a*, 810*b*, 810*c*.

Similarly, in accordance with K1 values of the SPS PDSCHs, the third PUCCH resources 808*c* are allocated in slot n+5 for the transmission of HARQ-ACKs associated with the third instance 802*c* of the first SPS PDSCH (which occurs in slot n+2)

the second instance 804*b* of the second SPS PDSCH (which occurs in slot n+2), and the second instance 806*b* of the third SPS PDSCH (which occurs in slot n+3).

HARQ-ACKs for each of these three instances are therefore multiplexed and transmitted using the third PUCCH resources 808*c*.

Based on the K1 value associated with the first SPS PDSCH, second PUCCH resources 808*b* in slot n+4 are allocated for the transmission of a HARQ-ACK associated with the second instance 802*b* of the first SPS PDSCH (which occurs in slot n+1). No other PUCCH resources are allocated for the transmission by the communications device of a HARQ-ACK for any other PDSCH instances during slot n+4. Accordingly, the communications device uses the second PUCCH resources 808*b* to transmit a HARQ-ACK associated with the second instance 802*b* of the first SPS PDSCH, as indicated by the dashed arrow 812.

Priorities

Uplink resources (such as resources allocated for the transmission of control information such as acknowledgement information) may be associated with a priority. According to 3GPP Release 16 specifications, where two uplink resource instances allocated on a PUCCH for the transmission of acknowledgement information overlap in time and they have different priorities, then only the higher priority instance is used. Information which would otherwise have been transmitted in the lower priority instance is not transmitted.

Figure 7:
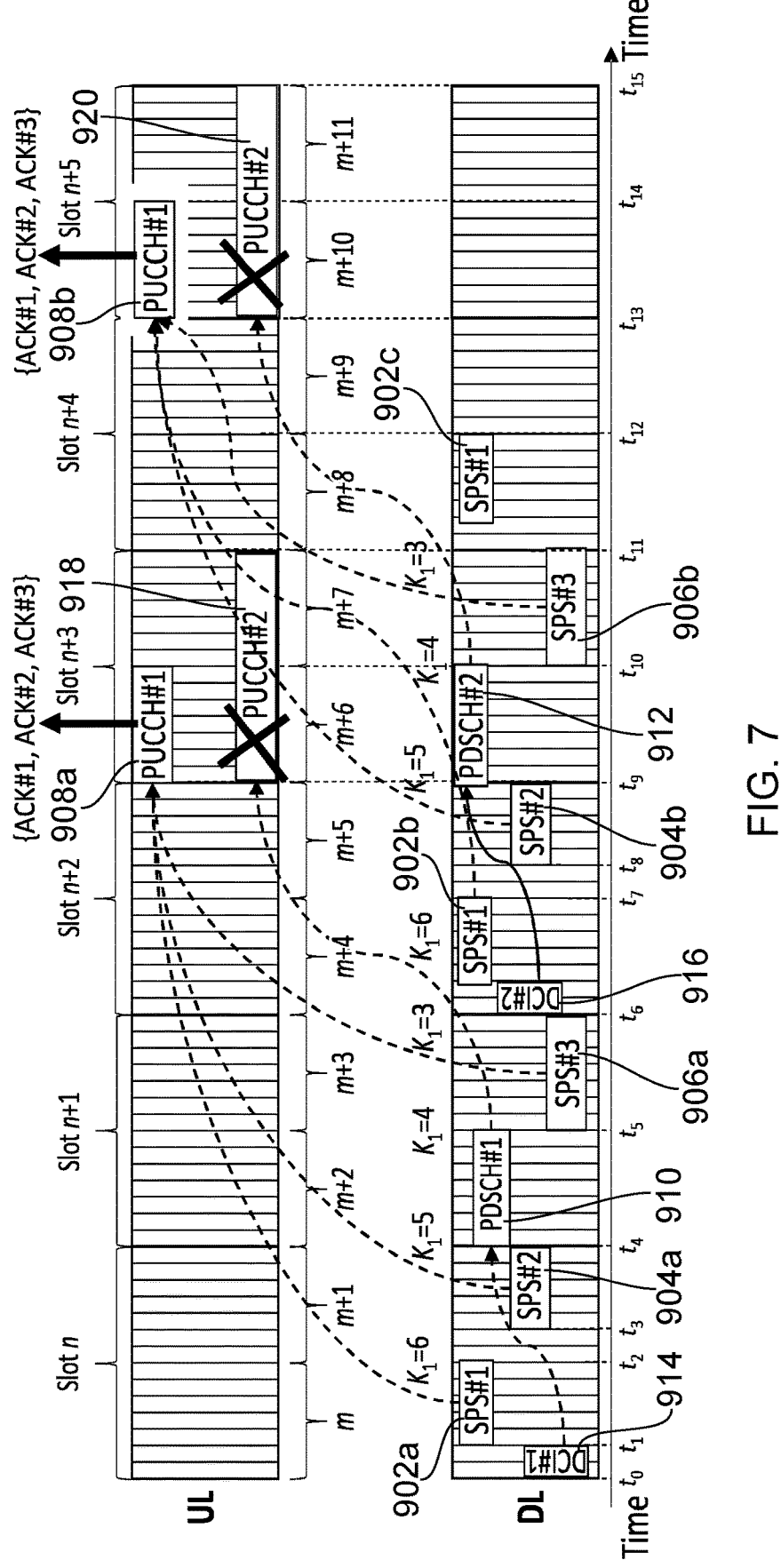
FIG. 7 shows an example of overlapping control channel resource allocations in accordance with conventional techniques.

FIG. 7 shows an example of overlapping PUCCH resource allocations in accordance with conventional techniques.

In the example of FIG. 7, instances 902*a*, 902*b* of a first SPS PDSCH, instances 904*a*, 904*b* of a second SPS PDSCH, and instances 906*a*, 906*b* of a third SPS PDSCH are shown. First and second PUCCH instances 908*a*, 908*b* are allocated for the transmission of HARQ-ACKs associated with instances of the first, second and third SPS PDSCHs.

In addition, first and second dynamically granted (DG) PDSCH instances 910, 912 are shown. These are allocated by respective downlink control information (DCI) transmissions 914, 916. Uplink resources 918, 920 are allocated for the transmission of HARQ-ACKs for the DG PDSCH instances.

The uplink resources 918, 920 overlap in time with the PUCCH resources 908*a*, 908*b*. The uplink resources 918, 920 are associated with a priority which is lower than that associated with the PUCCH resources 908*a*, 908*b* allocated for the transmission of SPS PDSCH HARQ-ACKs.

Accordingly, the uplink resources 918, 920 allocated for the HARQ-ACKs for the DG PDSCH instances are dropped, as indicated by the 'X' marks.

It has been recognised that dropping lower priority uplink transmissions is undesirable. This is because the control information that would otherwise have been transmitted using the low priority uplink resources is likely to be delayed or even may never be transmitted. It has therefore been proposed that multiplexing may be used to transmit control information using a single uplink resource instance, where the control information comprises both low priority and higher priority information. Herein, 'low priority' (respectively, 'high priority') may be used to characterise information which would have been sent using low priority (respectively, 'high priority') communication resources, in the absence of any overlap. The information may include acknowledgement information, scheduling requests, or any other information.

It has been proposed to permit multiplexing of low priority information and high priority information within a single instance of communication resources.

In accordance with conventional techniques, certain transmission formats (e.g. PUCCH format 0 or PUCCH format 1) can be used for the transmission of acknowledgement information, where the total number of bits of information (i.e. from both the low and high priority information) is two.

Where the total number of information bits in the data to be multiplexed is greater than two, proposed options include:

a) joint encoding the multiplexed data and transmitting the jointly-encoded data using the entirety of the uplink resource instance;

b) partitioning the resource instance and encoding and transmitting the data independently; or c) a combination of these options.

Although joint encoding could allow existing techniques to be re-used, it has certain disadvantages. For example, where a large amount of information is to be transmitted, the reliability (i.e. likelihood of successful reception and decoding) of all information may be affected, so that high priority data may incur a significant decrease in reliability.

There is therefore a need to provide a technical solution for providing an effective and efficient multiplexing scheme.

Embodiments of the present technique can provide a method of transmitting control information, the method comprising selecting third uplink communication resources for the transmission of first control information having a first priority and second control information having a second priority different from the first priority, selecting a first subset of the third uplink communication resources for the transmission of the first control information, selecting a second subset of the third uplink communication resources for the transmission of the second control information, independently encoding the first control information and the second control information, and transmitting to an infrastructure equipment the encoded first control information using the first subset of the third uplink communication resources and the encoded second control information using the second subset of the third uplink communication resources. In some embodiments, the method comprises receiving an allocation of first uplink communication resources for transmitting the first control information, receiving an allocation of second uplink communication resources for transmitting the second control information, and determining that the second uplink communication resources overlap in time with the first uplink communication resources.

Embodiments of the present technique can allow for independent encoding of data to be transmitted using a particular resource instance. Accordingly, appropriate levels of reliability may be achieved for data having different priorities.

Embodiments of the present technique can also provide for time for the determining and encoding of control information, permitting a communications device to operate within its indicated capabilities.

Referring to the example of FIG. 7, in accordance with embodiments of the present technique, each of the uplink resources 918, 920 are selected for the transmission of two portions of control information: a first portion corresponding to the acknowledgement information associated with the SPS PDSCH instances which would (in the absence of the overlap) have been sent using the PUCCH resources 908*a* or 908*b* respectively, and a second portion corresponding to the acknowledgement information associated with a respective one of the DG PDSCH instances 910, 912. Each of the portions may be independently encoded and transmitted using a subset of the uplink resources 918, 920.

Alternatively, in some embodiments, one or both of the PUCCH resources 908*a*, 908*b* may be selected for the transmission of two portion of control information.

In accordance with some embodiments, appropriate processing time at a transmitter may be provided in respect of each independently encoded portion of data. In particular, embodiments may avoid a scenario where encoding of data is required to be completed earlier than would be the case if there was no overlap.

FIG. 8 is a process flow chart for a method performed by a communications device in accordance with embodiments of the present technique. In this example, two instances of communication resources are considered, each allocated for the transmission of respective control information. However, it will be appreciated that the principles and techniques disclosed herein are not so limited and that any number of colliding resource instances and corresponding portions of control information are contemplated. In some embodiments, the number of colliding resource instances may be equal to the number of portions of control information, but the present disclosure is not so limited.

The process starts at step S1002, in which the communications device determines that first and second communication resources are allocated for the transmission of first and second control information by the communications device.

The communications device determines that the first and second uplink communication resources collide. This may be because the resources overlap in time, or because a separation time between the resources is below a particular threshold. In some embodiments, resources may be considered to collide if they both include resources within a same predetermined time window. For example, where the wireless access interface is divided in time units, communication resource instances which both comprise resources within a single time unit may be considered to collide. In some embodiments, the time units may be slots or sub-slots, and the wireless access interface may be an orthogonal frequency division multiplexing (OFDM)-based interface. A slot or sub-slot may comprise a predefined, or configured number of OFDM symbol periods. The first and second communication resources may be PUCCH communication resources. The first and second control information may be acknowledgement information, scheduling requests, or any other information.

Each of the first and second communication resources are associated with a different priority. The priority may be determined based on a priority associated with the respective first and second control information. The priority may be indicated by the infrastructure equipment in downlink control information (DCI), such as DCI which allocates the uplink communication resources. The priority may be a layer 1 (L1) priority. The priority may be RRC configured.

At step S1004, the communications device determines selected communication resources for the transmission of both the first and second control information.

In some embodiments, the selected communication resources are one of the first and second communication resources. In some embodiments, the selected communication resources differ from both the first and second communication resources. Further examples of how this step may be carried out are described below.

At step S1006, the total quantity of communication resources required for the transmission of the first and second control information is determined.

In an example embodiment, this may be determined as follows.

First, for each portion of the control information (e.g. for the first and second control information) a coding rate A is determined. This coding rate may be the rate that would have been used to transmit the control information using the resources allocated for the transmission of the control information, if there were no collision.

Additionally or alternatively, the coding rate may be configured by the wireless communications network. For example, by means of an indication in a DCI which allocates, or (in the case of an SPS resource) activates the uplink communications resources for the transmission of the control information. In some embodiments, the coding rate may be RRC configured.

The number of unencoded bits N for each portion is also determined. The number of encoded bits E resulting from the encoding of the N bits at a coding rate A is also determined.

For each portion, a modulation scheme to be used is determined, and hence a number of encoded bits B that can be transmitted per modulation symbol is determined. The required number of modulation symbols M required for the transmission of each portion is thus determined.

Control then passes to step S1008, where it is determined whether the communication resources selected at step S1004 are sufficient to transmit all portions of the control information. This may be determined as follows.

Based on the communication resources selected at step S1004, a total number of available modulation symbols is determined. For example, if the selected communication resources are orthogonal frequency division multiplexed (OFDM) resources, comprising S OFDM symbols (in the time domain) and K subcarriers (in the frequency domain), then the number of modulation symbols available may be given by SK.

If SK>ΣM (where ΣM is the total number of modulation symbols required for the transmission of all portions of the control information), then it is determined that the communication resources selected at step S1004 are sufficient to transmit all portions of the control information ('Yes') and control passes to step S1012.

Otherwise, it is determined that the communication resources selected at step S1004 are not sufficient to transmit all portions of the control information ('No') and control passes to step S1010.

At step S1010, the quantity of control information to be transmitted is reduced such that the communication resources selected at step S1004 are sufficient to transmit all portions of the control information.

Preferably, the quantity of control information to be transmitted is reduced by reducing the quantity of control information having a lower priority. Accordingly, embodiments of the present technique can ensure that high priority control information is transmitted in full, and using an appropriate encoding and modulation scheme to meet its reliability requirements.

Examples of how this may be carried out are described in further detail below.

After step S1010, control passes to step S1012.

Steps S1012, S1014 and S1016 are carried out for each portion of control information. If a portion of control information has been reduced at step S1010, then steps S1012, S1014 and S1016 may be carried out after step S1010. The order of the steps may be different from that shown. For example, in some embodiments, each instance of steps S1012 and S1014 may be carried out before any instance of step S1016. In some embodiments, an order of the instances of the steps may be determined by the communications device, based on a relative time between the selected communications resources and the times at which each portion of unencoded control information becomes (or is expected to become) available. For example, where a portion of control information comprises acknowledgement information indicating an acknowledgement status of data transmitted using downlink communication resources, the acknowledgement information (and hence the control information) may become available at a time period T after the end of the downlink communication resources, where T corresponds to a processing time for decoding the received signals, and determining the acknowledgement status of the data represented by the received signals.

It will be appreciated that certain steps (such as steps S1004, S1006 and S1008) may be carried out before the actual contents of the control information is known, if the amount of such information is known. For example, an amount of acknowledgement information may be determined prior to the receipt (and decoding) of the data to which the acknowledgement information relates.

In some embodiments, steps S1012 and S1014 may be carried out for each portion of control information, and subsequently, step S1016 may be carried out for each portion of control information.

In some embodiments, step S1012 may be carried out for each portion of control information, the order of the portions being determined by their respective priority. For example, step S1012 may be carried out first for the portion of control information having the highest priority, and subsequently for portions having lower priority.

In step S1012, for a given portion of control information, a subset of the resources selected at step S1004 are determined to be used for the transmission of that portion of control information. Examples of how this determination may be carried out are provided below.

At step S1014, the portion of control information is encoded in accordance with the selected modulation and encoding scheme for that portion.

At step S1016, the modulated and encoded control information is transmitted using the subset of resources determined at step S1012. In some embodiments, a transmission power is determined for the transmission of the modulated and encoded control information, based on the priority associated with the portion of control information being transmitted. Examples of this determination are provided below.

Each of steps S1012, S1014 and S1016 is carried out for each portion of control information. For example, following step S1016 for one portion, step S1018 may be used to determine whether further portions of control information are to be transmitted. If so ('Yes'), then control passes back to step S1012 for the next portion of control information. Otherwise ('No') control passes to step S1020 and the process ends.

Above have been given descriptions of an example process. The scope of the present disclosure is not, however, limited to the specific combination and sequence of steps and in some embodiments, various of the steps described may be omitted, or performed in a different manner or order, or otherwise modified. For example, in some embodiments, one or more steps above may be precluded by requirements of a standards specification and may therefore be omitted.

In some embodiments, a rate-matching step may be performed in respect of one or more portions of the control information. That is, in some embodiments, a determination of actual modulation and encoding parameters may be made for a certain portion of control information after step S1012 is carried out for that portion. The rate matching may be carried out in respect of control information which has been reduced (before modulation and encoding) in step S1010. The rate matching may comprise selecting modulation and/ or encoding parameters to provide a highest reliability for the transmission of the control information, when transmitted using the subset of communication resources determined at step S1012.

In some embodiments, rate matching is applied to all portions of control information.

In some embodiments, rate matching is applied only to portions of control information which do not have the highest priority of the portions of control information. For example, where the portions of control information are associated with either a high priority or a low priority, rate matching may be applied only to portions associated with the low priority.

In some embodiments, rate matching may be applied independently of whether the portion of control information has been subject to a reduction at step S1010.

Accordingly, in some embodiments, the encoding rate selected for a portion of control information may be different from the corresponding coding rate A determined at step S1006.

Accordingly, embodiments of the present technique permit appropriate modulation and coding schemes to be selected so that all portions of the control information can be transmitted using the resources selected at step S1004.

Selection of Resources

In some embodiments the selected communication resources (such as at step S1004 of the process of FIG. 8) are selected from an instance of communication resources associated with one or more of the portions of control information.

In some embodiments, a separate instance of communication resources may be allocated for the transmission of each portion of control information. Accordingly, the selected communication resources may be selected from an instance of communication resources allocated for the transmission of one or more of the portions of control information.

In some embodiments, a portion of control information may comprise multiple sub-portions. Preferably, all of the sub-portions of control information within a portion of control information are associated with the same priority. In some embodiments an instance of communication resources may be allocated for the transmission of each of one or more such sub-portions. In such an embodiment, the selection at step S1004 of communication resources for the transmission of multiple portions of control information may comprise the step of selecting communication resources from those associated with sub-portions of control information, the selected communication resources being then 'associated' with the portion of control information.

For example, each of two or more SPS PDSCH instances having a high priority may be associated with communication resources, allocated for the transmission of respective acknowledgement information. The acknowledgement information (such as a HARQ-ACK) associated with each of the two or more SPS PDSCH instances may correspond to respective sub-portions of control information. The acknowledgement information associated with the two or more SPS PDSCH instances may be combined (e.g. concatenated) to form a portion of control information. It will be appreciated that the portion of control information may be formed in any suitable manner from the constituent sub-portions, such as in accordance with a standards specification.

A step of selecting communication resources from those allocated for the transmission of sub-portions of control information may be carried out in any suitable manner. For example, the selection may be in accordance with 3GPP Release 16 specifications for the selection of resources to be used in the event that acknowledgement information for multiple SPS PDSCH instances is to be transmitted within a single time slot or sub-slot.

The communication resources selected from those allocated for the transmission of sub-portions of control information which are included in a portion of control information may be determined to be the communication resources associated with the portion of control information.

In some embodiments, the communication resources selected at step S1004 may be the communication resources having the greatest extent or capacity. Communication resources having the greatest capacity may be those which allow for the transmission of the greatest number of modulation symbols. The capacity may be determined after deducting resources (such as modulation symbols) which are required to be used for purposes other than the transmission of modulation symbols representing the control information. For example, symbols which are required to be used for demodulation reference signals (DMRS) or other reference signals may be discounted when assessing the capacity of communication resources.

Accordingly, embodiments of the present technique can provide a highly reliable transmission of the control information, because a more robust modulation and encoding scheme can be selected for the transmission of the control information.

In some embodiments, the communication resources selected at step S1004 may be the communication resources ending first. Accordingly, embodiments of the present technique can provide a low latency transmission of the control information.

In some embodiments, the communication resources selected at step S1004 may be the communication resources associated with the portion of control information having the highest priority. Accordingly, embodiments of the present technique can provide a selection which minimises the impact on the encoding and transmission processes for the control information having the highest priority.

Reduction of Control Information

In some embodiments, step S1010 may be carried out to reduce a quantity of control data in a portion of control data, in order to permit the portion of control information to be transmitted (or, to be transmitted with a certain reliability) using a subset of the selected communication resources.

Any suitable technique may be used to reduce the quantity of control information.

In some embodiments, where the control information is acknowledgement information, 'bundling' may be applied. Bundling may involve steps of combining two or more bits of acknowledgement information to generate a reduced number of bits.

For example, where a bit is a '1' to indicate a successful reception and decoding of a downlink data portion (which may correspond to a transport block or a code block), a logical 'AND' combination of two or more such bits results in a '1' if and only if each of the original bits is a '1'. The output of the combination may be transmitted instead of the original bits.

Figure 9:
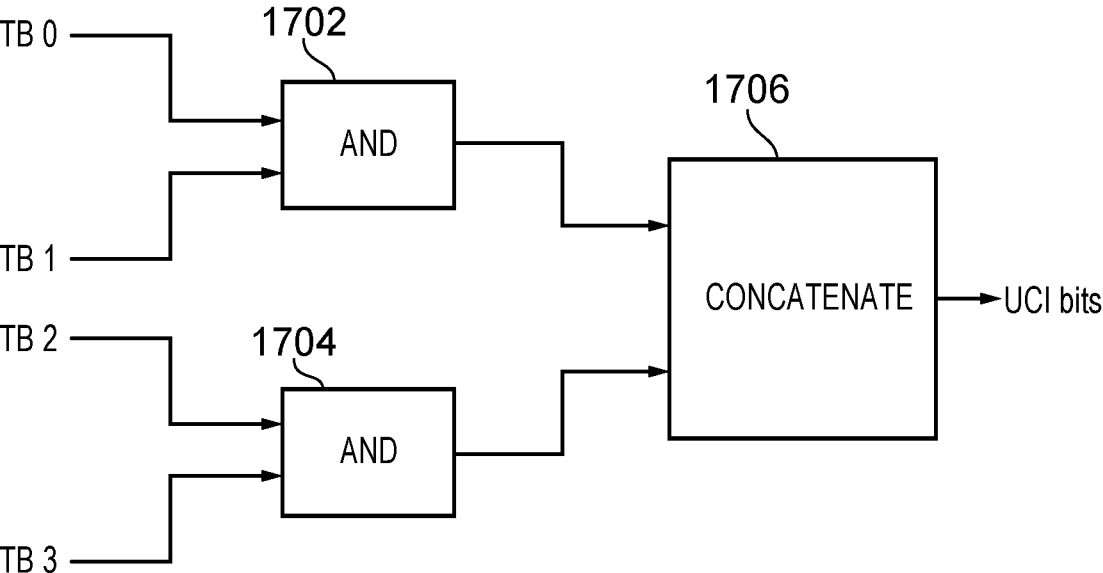
FIG. 9 shows a logical process for the reduction of control information in accordance with embodiments of the present technique.

FIG. 9 shows a logical process for the reduction of control information in accordance with embodiments of the present technique.

In the example of FIG. 9, the control information is acknowledgement information, with each bit indicating an acknowledgement status of one transport block (TB). Accordingly, as shown in FIG. 9, bits TB0, TB1, TB2 and TB3 are inputs to the process. First and second logic processes 1702, 1704 combine, pairwise, the input bits by means of an 'AND' operation. Third logic process 1706 concatenates the outputs of the logic processes 1702, 1704. For example, if the input bits TB0-3 were respectively 0, 1, 1, 1, then the output of the first and second logic processes 1702, 1704 would be 0 and 1, and the output of the third logic process 1706 would be '01'. Accordingly, the number of control information bits has been reduced from 4 to 2. It will be appreciated that FIG. 9 shows four input bits merely as an example, and that a larger number of input bits may be processed sequentially and/or in parallel by using additional logic processes.

In some embodiments, control information may comprise channel state information (CSI). CSI may provide the infrastructure equipment with an indication of measurements of the wireless channel between the infrastructure equipment and the communications device. The control information may comprise CSI in combination with acknowledgement information, a scheduling request (SR) message, and/or other information. In order to reduce the amount of control information to be sent, some or all CSI may be dropped from the control information in some embodiments.

The manner in which step S1010 is carried out is known to the infrastructure equipment. For example, the manner may be in accordance with standards specification, or may be indicated in signalling transmitted by the infrastructure equipment.

Accordingly, embodiments of the present technique can provide for a deterministic approach to reducing an amount of control information, to permit the transmission of multiple portions of control information within a single set of selected resources.

Selection of Subset of Resources

In some embodiments, step S1012 is carried out differently for different portions of the control information. In some embodiments, step S1012 may be carried out first in respect of the portion of control information having the highest priority. Subsequent iterations of step S1012 may be carried out for the portion of control information having the next highest priority, and so on.

In some embodiments, step S1012 may be carried out by considering, as the selected communication resources, the portion(s) of the communication resources selected at step S1004 which have not already been selected for the transmission of other control information by an earlier iteration of step S1012. In some embodiments, when there remains only one portion of control information for which a subset of communication resources is to be selected, the subset of communication resources selected for that portion is the portion(s) of the communication resources selected at step S1004 which have not already been selected for the transmission of other control information.

In some embodiments, the subset of communication resources is that which occurs earliest in time of the selected communication resources. Accordingly, when step S1012 is carried out for portions of control information in decreasing priority order, high priority control information is transmitted and received earliest, thus ensuring a low latency transmission of high priority control information.

In some embodiments, the selection of a subset of resources to be used for the transmission of a portion of control information is based on a timing of the communication resources associated with that portion of control information, relative to a time instant. The time instant may be after the start of the selected resources and before the end of the selected resources, and may be determined in a pre-determined manner which is also known to the infrastructure equipment.

In some embodiments, the time instant may be the midpoint in time between the start and end times of the selected resources. In some embodiments, the time instant may align with a slot or sub-slot boundary.

In some embodiments, if the communication resources associated with a portion of control information begin before the time instant, then the selected subset of resources starts at the beginning of the selected communication resources.

Embodiments of the present technique can thus permit a low latency transmission of high priority control information with a low latency.

Figures 10, 11:
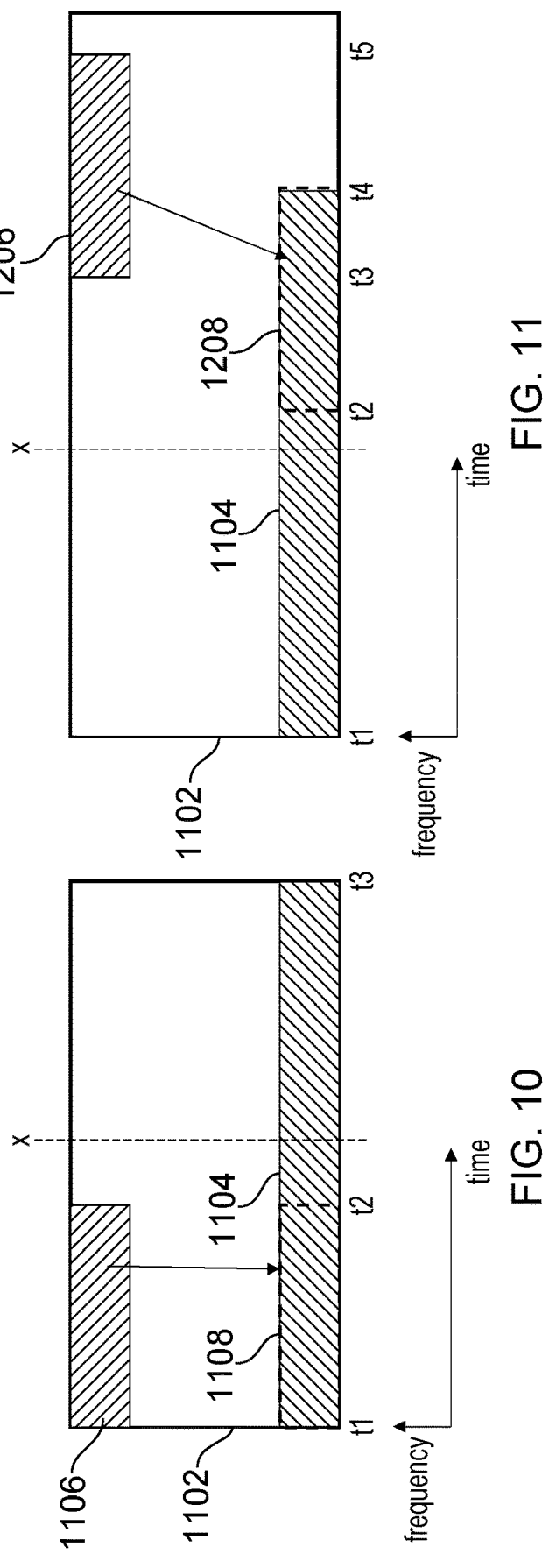
FIG. 10 and FIG. 11 illustrate a selection of a subset of resources to be used for the transmission of a portion of control information, in accordance with embodiments of the present technique.

FIG. 10 shows a selection of a subset of the resources, selected at step S1004, to be used for the transmission of a portion of control information, in accordance with some embodiments of the present technique. FIG. 10 shows uplink resources 1102 of a wireless access interface. First resources 1104 which extend from time t1 to time t3 are selected at step S1004 for the transmission of the portions of control information. In the example of FIG. 10, the first resources 1104 were allocated for the transmission of one of the portions of control information (a first portion), but in some embodiments this is not the case.

Second resources 1106 were allocated for the transmission of a second portion of control information. The second resources extend from time t1 to time t2. A time instant 'X' is shown, which is determined in accordance with pre-defined rules. These rules may be configured by the infrastructure equipment, specified in a standards specification, or a combination of these.

In the example of FIG. 10, because the second resources 1106 begin (at t1) before the time instant 'X', then the subset of resources selected for the transmission of the second portion of control information starts at the beginning of the first communication resources 1104. In the example of FIG. 10, the subset is the subset of resources 1108, which has the same extent (i.e. dimensions in time and frequency) as the second communication resources 1106 which were originally allocated for the transmission of the second portion of control information. However in some embodiments, the extent of the subset may be different from that of the originally allocated resources.

In the example of FIG. 10, the remaining portion of the first resources 1104 (i.e. the portion from time t2 until t3) may be selected for the transmission of other portions of control information, such as the first portion of control information.

Additionally or alternatively, if the communication resources associated with a portion of control information begin after the time instant, then the selected subset of resources ends at the end of the selected communication resources.

Embodiments of the present technique can thus ensure that there is sufficient time for the high priority control information to be processed and encoded before transmission.

FIG. 11 shows a selection of a subset of the resources selected at step S1004 to be used for the transmission of a portion of control information, in accordance with some embodiments. As with FIG. 10, FIG. 11 shows uplink resources 1102 of a wireless access interface and first resources 1104 which extend from time t1 to time t4, the first resources selected at step S1004 for the transmission of the portions of control information. As in the example of FIG. 10, the first resources 1104 were allocated for the transmission of one of the portions of control information (a first portion), but in some embodiments this is not the case.

Second resources 1206 allocated for the transmission of a second portion of control information extend from time t3 until time t5. The time instant X is also shown.

In the example of FIG. 11, because the second resources 1206 begin (at t3) after the time instant 'X', then the subset of resources selected for the transmission of the second portion of control information ends at the end of the first communication resources 1104. In the example of FIG. 11, the subset is the subset of resources 1208, which has the same extent (i.e. dimensions in time and frequency) as the second communication resources 1206 which were originally allocated for the transmission of the second portion of control information. However, in some embodiments, the extent of the subset may be different from that of the originally allocated resources.

In the example of FIG. 11, starting the transmission of the second portion of control information at time t2 allows the communications device sufficient time to determine and encode the second portion of control information.

In some embodiments, the communications device may determine that it is not possible to transmit a portion of control information using a subset of selected resources, because it would not be possible to determine and encode the portion of control information within the resulting duration before the start of the subset of selected resources in a manner compatible with capabilities associated with the communications device. This may be because, for example, the portion of control information comprises acknowledgement information regarding downlink data, and determining the control information requires receiving and decoding (or attempting to decode) the downlink data. An indication of the capabilities may be transmitted to the infrastructure equipment, or may be obtained by the infrastructure equipment from a core network element of the wireless communication network.

In response to determining that it would not be possible to determine and encode the portion of control information within the resulting duration before the start of the subset of selected resources, the communications device may transmit the portion of control information using communication resources allocated for the transmission of that control information. In some embodiments, this may be applied only in respect of control information having a certain priority (e.g. where there are two priority levels, the higher priority level).

For example, referring to FIG. 11, if, according to the indicated capabilities of the communications device, it was not possible to transmit the second portion of control information starting at time t2, then the communications device may refrain from transmitting using the first resources 1104, and may instead transmit the second portion of control information using the second resources 1206.

Figure 12A:
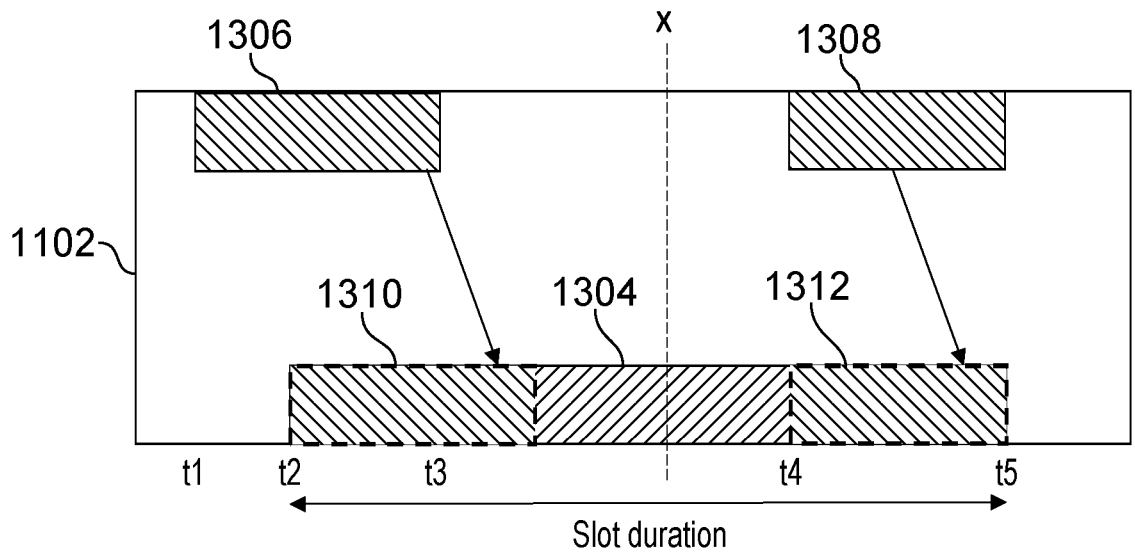
FIG. 12A and FIG. 12B illustrate a selection of subsets of resources to be used for the transmission of three portions of control information, in accordance with some embodiments of the present technique.
Figure 12B:
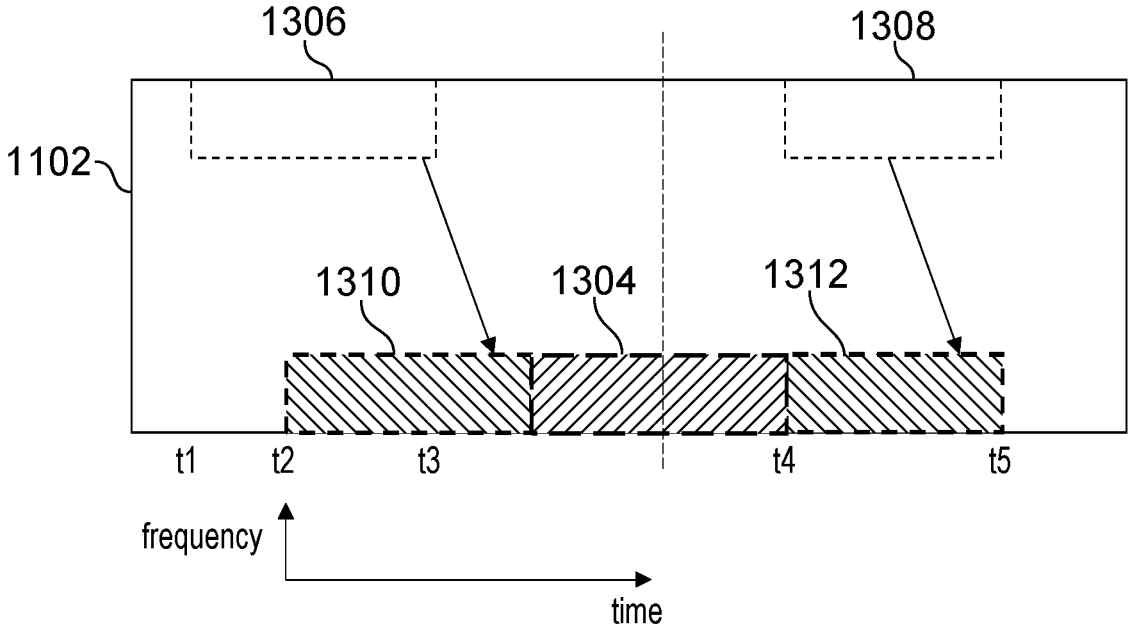

FIG. 12A and FIG. 12B show a selection of subsets of the resources selected at step S1004 to be used for the transmission of three portions of control information, in accordance with some embodiments of the present technique.

In the example of FIG. 12A and FIG. 12B, three portions of control information are to be transmitted using a first set of resources 1304, which were selected at step S1004 and extend in time from time t2 to time t5. These resources were, in this example, allocated for the transmission of the first portion of control information. The first resources 1304 may have been selected because, of the resources allocated for respective portions of control information, they have the greatest capacity. Second and third resources 1306, 1308 were allocated respective for the transmission of the second and third portions of the control information. The second resources 1306 extend from time t1 to time t3, and the third resources 1308 extend in time from time t4 to time t5.

In the example of FIG. 12A and FIG. 12B, because the second and third portions have higher priority than the first portion, step S1012 is carried out in respect of the second and third portions, before being carried out in respect of the first portion.

As in the example of FIG. 10, the second resources 1306 start before the time instant X, and accordingly, a subset 1310 of resources is selected for the transmission of the second portion of control information, which starts at time t2 i.e. the start of the first resources 1304.

The third resources 1308 start after the time instant X, and accordingly, a subset 1312 of resources is selected for the transmission of the third portion of control information, which starts at time t4 and ends at time t5 i.e. the end of the first resources 1304.

After the selection of the subsets 1310, 1312 for the transmission of the higher priority (second and third) por-tions of control information, the remaining subset 1314 of the first resources 1304 is selected as the subset for the transmission of the first (lower priority) portion of control information. FIG. 12B shows the resulting subsets 1310, 1312, 1314 selected for, respectively, the second, third and first portions of control information.

In the example of FIG. 12A and FIG. 12B, rate matching and/or a reduction in the amount of information for the first portion of control information may be applied as a result of the reduced extent of resources selected for its transmission, compared with the originally allocated resources 1304.

In some embodiments, resource allocations for the transmission of control information may be made on a slot basis or on a sub-slot basis. For example, with reference to the example of FIG. 12A and FIG. 12B, the second and third resources 1306, 1308 may be allocated on a sub-slot duration and occur within different sub-slots, while the first resources 1304 are based on a slot duration.

Resources allocated on a sub-slot basis may in some embodiments be considered to collide with resources allocated on a slot basis, if there is a slot or sub-slot which includes at least a portion of both resources.

Accordingly, embodiments of the present technique can permit the multiplexing of control information which (absent a collision) may have been transmitted using resources allocated on a sub-slot basis and in different sub-slots.

In some embodiments, a resolution of a collision, by means of multiplexing using the techniques disclosed herein, may avoid the need to resolve a further collision. For example, referring to FIG. 12A, if (in accordance with techniques disclosed herein) the collision between the first resources 1304 and the second resources 1306 is resolved by selecting the second resources 1306 for the transmission of multiplexed control information, then the first resources 1304 may be disregarded for the purposes of determining further collisions, such as with the third resources 1308. Accordingly, in some embodiments, the third resources 1308 may be used for the transmission of the third portion of control information.

In some embodiments, where the communication resources are OFDM resources, within an OFDM symbol, a first set of subcarriers may be used for one portion of control information, and a second set of subcarriers may be used for another portion of control information. In other words, within the OFDM symbol some subcarriers may be within one subset of resources, and other subcarriers may be within another subset of resources.

Embodiments of the present technique can thus provide transmission schemes which make efficient use of the communication resources.

Figures 13A, 13B:
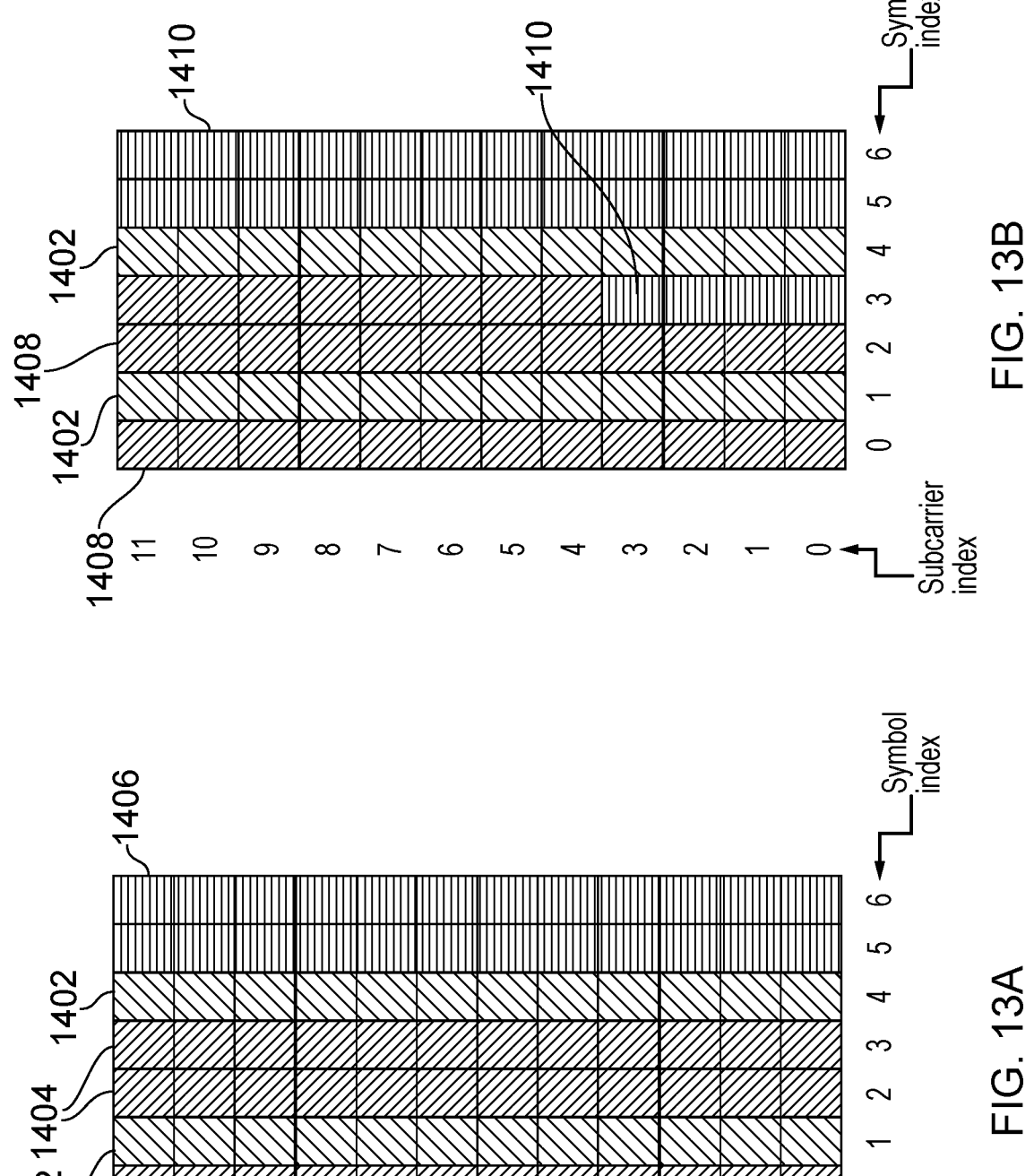
FIG. 13A, FIG. 13B, FIG. 14A, FIG. 14B, FIG. 15A and FIG. 15B illustrate example selections of subsets of resources in accordance with embodiments of the present technique.

FIG. 13A and FIG. 13B illustrate example selections of subsets of resources in accordance with embodiments of the present technique.

In FIG. 13A and FIG. 13B OFDM resources are shown corresponding to seven OFDM symbol periods (in the time domain) and 12 subcarriers in the frequency domain, to form a grid of resource elements, where one resource element (RE) corresponds to one subcarrier for a duration of one OFDM symbol.

In some embodiments, certain REs 1402 are reserved for reference signals, such as demodulation reference signals (DMRS).

In the example of FIG. 13A, a first set of REs 1404 are selected to form a first subset of communication resources, and a second set of REs 1406 are selected to form a second subset of communication resources. Each of the first and second subsets extend in time over a number of OFDM symbols, and over all REs within those symbols.

In contrast, in the example of FIG. 13B, the REs in the OFDM symbol having an index value of 3 are apportioned between the first subset 1408 and the second subset 1410.

As in the examples of FIG. 13A and FIG. 13B, resources within a subset may be discontinuous, for example to accommodate reference signals, which may be arranged in accordance with a predetermined scheme.

In the examples of FIG. 10, FIG. 11, FIG. 12A and FIG. 12B, and FIG. 13A and FIG. 13B, resource subsets are selected in a 'frequency-first' manner: that is, the selected resources are initially divided in time, and, to the extent possible, all REs within a resulting time period are allocated to the same subset.

Accordingly, latency requirements can be satisfied in respect of portions of control information so that, for example, high priority control information may be transmitted (and received) first. Embodiments can also provide for frequency diversity of resources within a subset.

In some embodiments, resources may be allocated to subsets in a 'time-first' manner, or a hybrid manner.

Figures 14A, 14B:
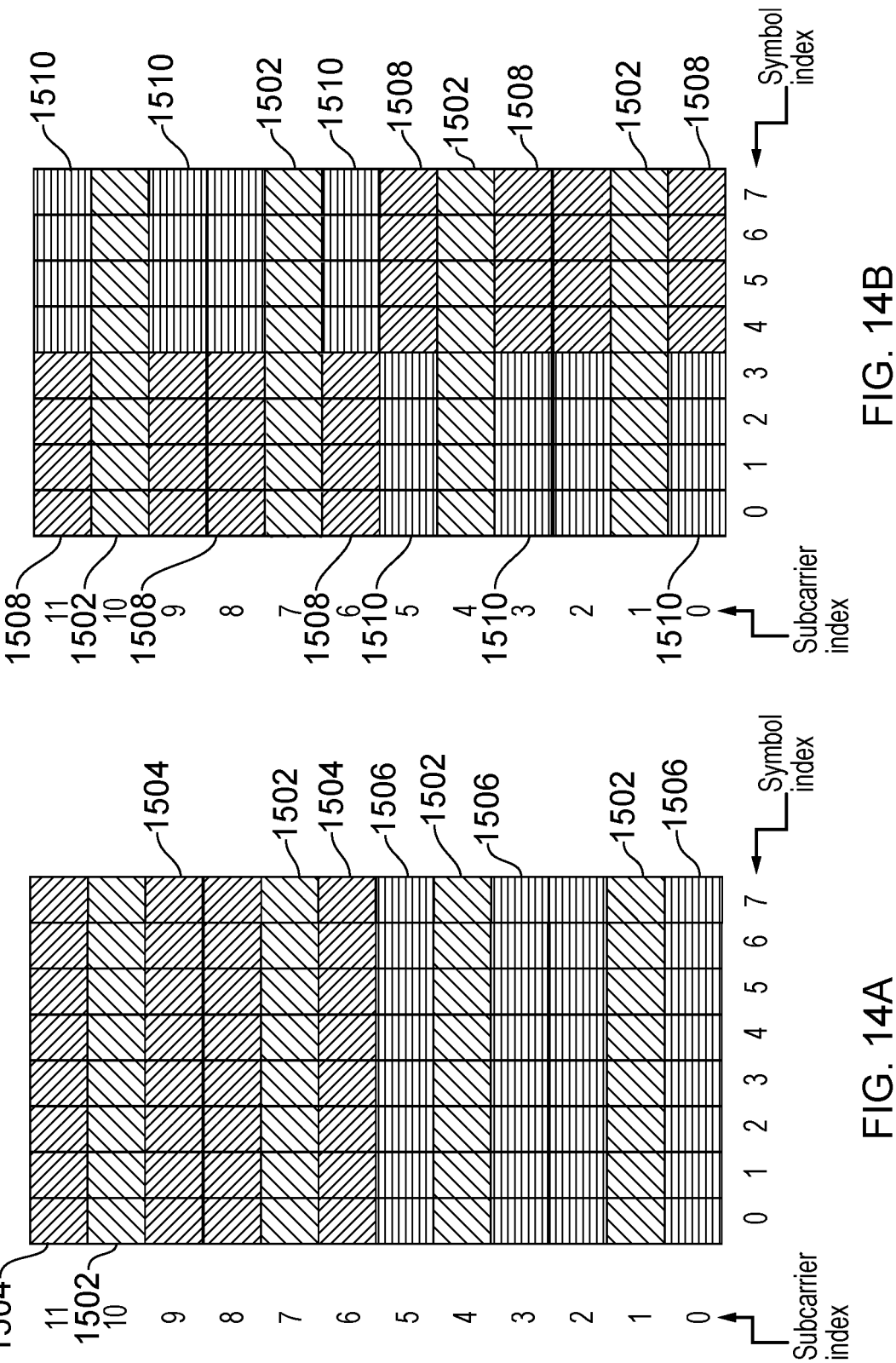

FIG. 14A and FIG. 14B illustrate example selections of subsets of resources in accordance with embodiments of the present technique. In both FIG. 14A and FIG. 14B, certain resource elements 1502 are reserved for DMRS.

In FIG. 14A, time-first allocation is used to allocate a first subset of resources 1504, which comprise resource elements in each of eight OFDM symbols on four subcarriers. Similarly, a second subset of resources 1506 comprises resource elements in each of eight OFDM symbols on four different subcarriers.

Accordingly, embodiments of the present technique can provide improved reliability through time diversity.

In FIG. 14B, a hybrid allocation scheme is used. In the hybrid scheme, the subset comprises frequency hopping resources, such that in one OFDM symbol, a first set of subcarriers are used, and in a different OFDM symbol, a second set of subcarriers are used. Accordingly, in the example of FIG. 14B, the first subset of resources 1508 comprise resource elements in each of eight OFDM symbols. However, in the first four OFDM symbols, subcarriers 6, 8, 9 and 11 are used, and in the second four OFDM symbols, subcarriers 0, 2, 3 and 5 are used. Similarly, a second subset of resources 1510 comprises resource elements in each of eight OFDM symbols, where the subcarriers used in the first symbols are different from those used in the later symbols.

Embodiments of the present technique can thus provide improved reliability through a combination of time and frequency diversity.

In some embodiments, the use of time-first, or hybrid allocation of resources to a subset is conditional on whether latency constraints can be satisfied. For example, referring to the examples of FIG. 14A and FIG. 14B, where it is required that the transmission of the first control information using the first subset 1504, 1508 of resources is completed prior to OFDM symbol 5, then the time-first or hybrid allocation is not used, and a different allocation scheme is used instead.

In some embodiments, the allocation scheme (time-first, hybrid or frequency-first) may be configurable by the infrastructure equipment.

In the examples of FIG. 13A, FIG. 13B and FIG. 14A, the subsets are broadly contiguous (ignoring DMRS resource elements). In some embodiments, discontinuous allocations are provided to further provide improved reliability for some portions of the control information.

Figure 15A:
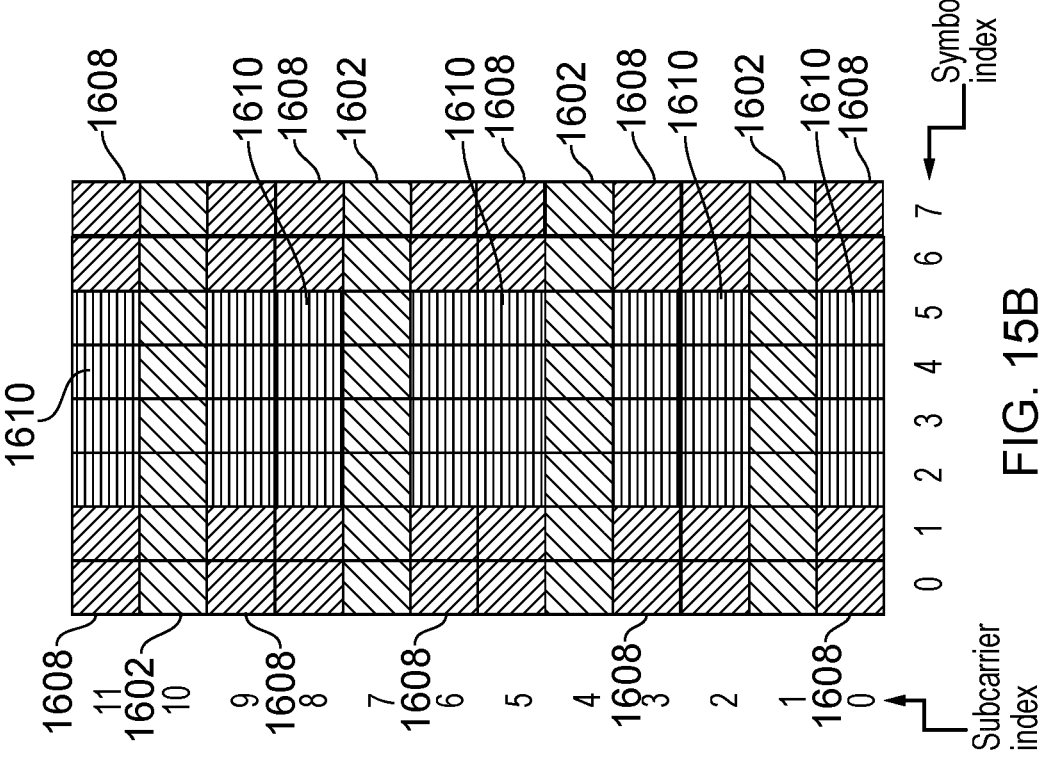
Figure 15B:
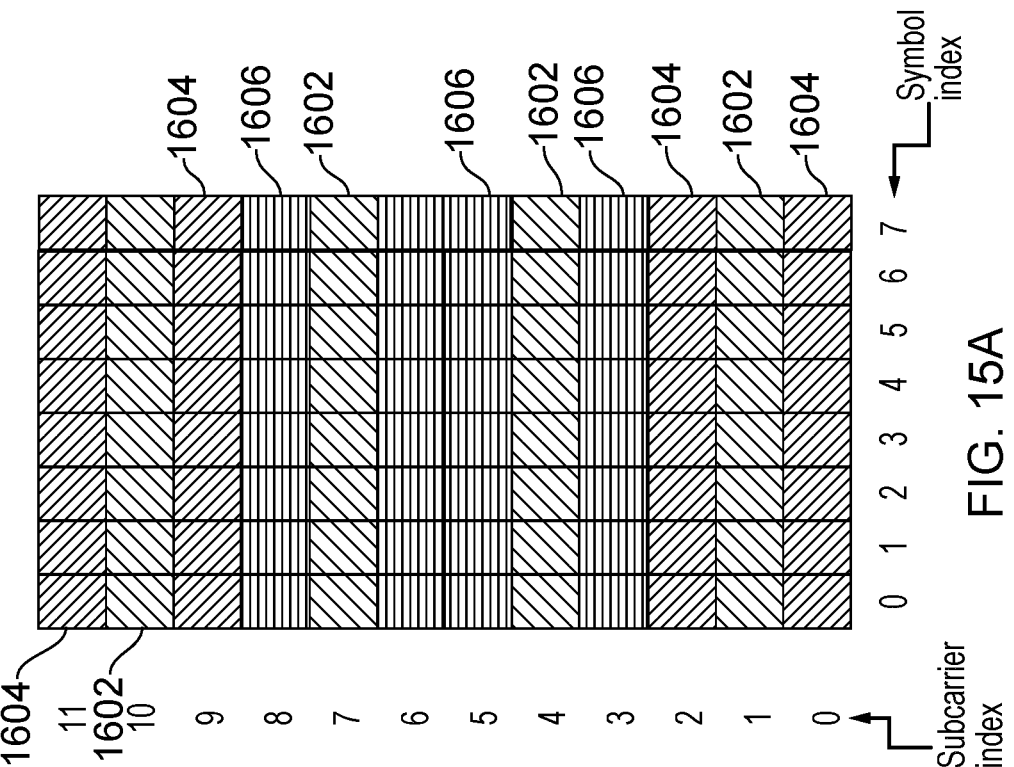

FIG. 15A and FIG. 15B illustrate example selections of subsets of resources in accordance with embodiments of the present technique. In FIG. 15A and FIG. 15B, DMRS resource elements 1602 occupy all resource elements on subcarriers 1, 4, 7 and 10.

FIG. 15A illustrates an example of non-contiguous, time-first allocation. In particular, the first subset of resources 1604 comprises resources on subcarriers 0, 2, 9 and 11. Accordingly, the resources are separated in frequency more than, for example, the case in FIG. 14A. The second subset of resources 1606 comprises the remaining resource elements not allocated for DMRS or for the first subset.

Embodiments of the present technique can thus provide significant frequency diversity, in respect of at least one subset of resources. In the example of FIG. 15A, this is the first subset.

FIG. 15B illustrates an example of non-contiguous, frequency-first allocation. In particular, the first subset of resources 1608 comprises resources on OFDM symbols 0, 1, 6 and 7. Accordingly, the resources are separated in time more than, for example, the case in FIG. 13A. The second subset of resources 1610 comprises the remaining resource elements not allocated for DMRS or for the first subset.

Embodiments of the present technique can thus provide significant time diversity, in respect of at least one subset of resources. In the example of FIG. 15B, this is the first subset.

Selection of Transmission Power

In some embodiments, a transmission power used for the transmission of a modulation symbol within a resource element is selected (such as at step S1016 of the process of FIG. 8) independently of the subset of resources associated with that resource element. Such embodiments can provide a low-complexity transmission scheme. Accordingly, the transmission power of a modulation symbol within a resource element may be selected independently of the portion of control information which it conveys.

In some embodiments, the transmission power used for the transmission of a modulation symbol within a resource element is dependent on (i.e. is selected based on) the subset of resources associated with that resource element. The transmission power used for the transmission of a modulation symbol may thus depend on which portion of control information it is used to convey. For example, in some embodiments, a transmit power used for resource elements used for the transmission of higher priority control information is higher than a transmit power used for low priority control information.

For example, referring to FIG. 15A, if the first subset of resources 1604 is for the transmission of high priority control information, then those resource elements within the first subset of resources may be transmitted at a higher power than the resource elements within the second subset of resources 1606.

In some embodiments, a transmit power level used for reference signals may be independent of the priority of control information transmitted using neighbouring resource elements, in order to ensure reliable channel estimation.

In some embodiments, an average power used on resource elements within the communication resources selected at step S1004 may be the same as the average power level that would have been used in respect of the transmission of control information using the first set of communication resources 1304, had there been no collision.

In some embodiments, different OFDM symbols may be transmitted using different transmit power, according to the priority of the control information transmitted using those symbols. For example, referring to FIG. 13A, if the first subset of resources 1404 is selected for the transmission of a high priority portion of control information, and the second subset 1406 is selected for the transmission of a low priority portion of control information, then the OFDM symbols 0, 2, 3 and 4 may be transmitted at a higher power than symbols 5 and 6.

However, in some embodiments, different resource elements within a single OFDM symbol may be transmitted using different transmit power. For example, referring to FIG. 13B, if the first subset of resources 1408 is selected for the transmission of a high priority portion of control information, and the second subset 1410 is selected for the transmission of a low priority portion of control information, then for the OFDM symbol 3, the resource elements on subcarriers 4 to 11 (inclusive) may be transmitted at a higher power than the resource elements on subcarriers 0 to 3 (inclusive).

The use of a time-first or hybrid selection of resources for subsets, as illustrated in the examples of FIG. 14A, FIG. 14B, and FIG. 15A, may be particularly suitable for a priority-dependent transmission power scheme. This may be because the average power over each OFDM symbol (or the total energy used for transmission of each symbol) may be the same for each of the symbols.

In some embodiments, the power used for a resource element, when dependent on the priority of the associated control information is determined in accordance with a configuration set by the infrastructure equipment. For example, the infrastructure equipment may transmit to the communications device an indication of a power offset between a low power (used for resource elements associated with low priority control information) and a high power (used for resource elements associated with high priority control information). The indication may be transmitted in a radio resource control, RRC, configuration message.

Corresponding gNB Process

In accordance with embodiments of the present technique, there is provided a method for an infrastructure equipment for receiving the multiple portions of control information, which are independently encoded and transmitted using a single instance of uplink communication resources.

Because the infrastructure equipment performs the allocation of uplink and downlink communication resources, it may determine in accordance with embodiments of the present technique that uplink resources allocated to the communications device for the transmission of control information collide. It may then determine which communication resources the communications device will select for the transmission of the portions of the control information. It may also determine the subset of resources to be used for each portion of the control information. The infrastructure equipment may also determine the modulation and/or encoding schemes that will be used for the transmission of the portions of control information, and (in some embodiments) whether, and if so how, any of the control information will be reduced.

These steps may be substantially similar to the corresponding steps performed by the transmitting device as described above.

The infrastructure equipment may accordingly receive and decode signals transmitted using the selected communication resources, based on the outcomes of the preceding steps.

Where the control information includes acknowledgement information, the infrastructure equipment may schedule a further retransmission of previously transmitted downlink data, if the control information indicates that the downlink data was not received correctly (or does not confirm that the downlink data was received correctly).

Embodiments of the present technique can thus provide for the transmission and reception of multiple portions of control information in the event that resources allocated for the uplink transmission of the control information collide.

Configuration and Signalling

In some embodiments, rules for transmitting control information are predetermined and configured at the communications device and infrastructure equipment. For example, in some embodiments, encoding rules are configured in accordance with standards specifications.

In some embodiments, explicit signalling of one or more parameters is carried out by the infrastructure equipment to the communications device. For example, in some embodiments, RRC configuration signalling is used to indicate how a communications device is to encode different portions of control information.

In some embodiments, dynamic signalling may be used to signal these parameters. Examples of dynamic signalling include a DCI which allocates downlink communication resources, or a DCI which activates a semi-persistent resource allocation.

Thus there has been described a method of transmitting control information, the method comprising selecting third uplink communication resources for the transmission of first control information having a first priority and second control information having a second priority different from the first priority, selecting a first subset of the third uplink communication resources for the transmission of the first control information, selecting a second subset of the third uplink communication resources for the transmission of the second control information, independently encoding the first control information and the second control information, and transmitting to an infrastructure equipment the encoded first control information using the first subset of the third uplink communication resources and the encoded second control information using the second subset of the third uplink communication resources.

There has also been described a method of transmitting control information by a communications device, the method comprising selecting third uplink communication resources for the transmission of first control information having a first priority and second control information having a second priority different from the first priority, determining a time instant, the time instant being after the start of the third communication resources and before the end of the third communication resources, determining that first uplink communication resources allocated for the transmission of the first control information begin after the time instant and selecting a first subset of the third uplink communication resources such that the end of the first subset occurs at the time of the end of the third uplink communication resources, determining that the transmission of the first control information using the first subset of the third uplink communication resources is incompatible with capabilities of the communications device, and in response to determining that the transmission of the first control information using the first subset of the third uplink communication resources is incompatible with the capabilities of the communications device, transmitting the first control information using the first uplink communication resources allocated for the transmission of the first control information.

There has also been described a method of receiving control information, the method comprising transmitting an allocation of first uplink communication resources for transmitting first control information having a first priority, transmitting an allocation of second uplink communication resources for transmitting second control information having a second priority different from the first priority, determining that the second uplink communication resources collide with the first uplink communication resources, receiving encoded first control information transmitted using a first subset of third uplink communication resources and encoded second control information transmitted using a second subset of the third uplink communication resources, the first and second control information being independently encoded, and decoding the first control information and the second control information.

There has also been described a method of receiving control information, the method comprising transmitting to a communications device an allocation of first uplink communication resources for a transmission by the communications device of first control information having a first priority, transmitting an allocation of second uplink communication resources for a transmission by the communications device of second control information having a second priority different from the first priority, determining that the second uplink communication resources collide with the first uplink communication resources, determining third uplink communication resources for the transmission of the first control information and the second control information, determining a time instant, the time instant being after the start of the third communication resources and before the end of the third communication resources, determining that the first uplink communication resources begin after the time instant, identifying a first subset of the third uplink communication resources such that the end of the first subset occurs at the time of the end of the third uplink communication resources, determining that a transmission of the first control information using the first subset of the third uplink communication resources is incompatible with capabilities of the communications device, and in response to determining that the transmission of the first control information using the first subset of the third uplink communication resources is incompatible with the capabilities of the communications device, receiving the first control information using the first uplink communication resources.

Corresponding apparatus, circuitry and computer readable media have also been described.

It will be appreciated that while the present disclosure has in some respects focused on implementations in an LTE-based and/or 5G network for the sake of providing specific examples, the same principles can be applied to other wireless telecommunications systems. Thus, even though the terminology used herein is generally the same or similar to that of the LTE and 5G standards, the teachings are not limited to the present versions of LTE and 5G and could apply equally to any appropriate arrangement not based on LTE or 5G and/or compliant with any other future version of an LTE, 5G or other standard.

It may be noted various example approaches discussed herein may rely on information which is predetermined/predefined in the sense of being known by both the base station and the communications device. It will be appreciated such predetermined/predefined information may in general be established, for example, by definition in an operating standard for the wireless telecommunication system, or in previously exchanged signalling between the base station and communications devices, for example in system information signalling, or in association with radio resource control setup signalling, or in information stored in a SIM application. That is to say, the specific manner in which the relevant predefined information is established and shared between the various elements of the wireless telecommunications system is not of primary significance to the principles of operation described herein. It may further be noted various example approaches discussed herein rely on information which is exchanged/communicated between various elements of the wireless telecommunications system and it will be appreciated such communications may in general be made in accordance with conventional techniques, for example in terms of specific signalling protocols and the type of communication channel used, unless the context demands otherwise. That is to say, the specific manner in which the relevant information is exchanged between the various elements of the wireless telecommunications system is not of primary significance to the principles of operation described herein.

It will be appreciated that the principles described herein are not applicable only to certain types of communications device, but can be applied more generally in respect of any types of communications device, for example the approaches can be applied in respect of any type of communications device.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered paragraphs:

Paragraph 1. A method of transmitting control information, the method comprising selecting third uplink communication resources for the transmission of first control information having a first priority and second control information having a second priority different from the first priority, selecting a first subset of the third uplink communication resources for the transmission of the first control information, selecting a second subset of the third uplink communication resources for the transmission of the second control information, independently encoding the first control information and the second control information, and transmitting to an infrastructure equipment the encoded first control information using the first subset of the third uplink communication resources and the encoded second control information using the second subset of the third uplink communication resources.

Paragraph 2. A method according to paragraph 1, the method comprising receiving an allocation of first uplink communication resources for transmitting the first control information, receiving an allocation of second uplink communication resources for transmitting the second control information, and determining that the second uplink communication resources collide with the first uplink communication resources.

Paragraph 3. A method according to paragraph 2, wherein the third uplink communication resources is the first communication resources.

Paragraph 4. A method according to paragraph 2 or paragraph 3, wherein selecting the third uplink communication resources comprises selecting, as the third uplink communication resources, the first uplink communication resources if a capacity of the first uplink communication resources is greater than a capacity of the second communication resources.

Paragraph 5. A method according to any of paragraphs 2 to 4, wherein selecting the third uplink communication resources comprises selecting, as the third uplink communication resources, the first uplink communication resources if the first priority is higher than the second priority.

Paragraph 6. A method according to any of paragraphs 2 to 5, wherein selecting the third uplink communication resources comprises selecting, as the third uplink communication resources, the first uplink communication resources if a time at which the first uplink communication resources ends is earlier than a time at which the second uplink communication resources ends.

Paragraph 7. A method according to any of paragraphs 2 to 6, the method comprising determining a time instant, the time instant being after the start of the third communication resources and before the end of the third communication resources.

Paragraph 8. A method according to paragraph 7, the method comprising determining that the first priority is higher than the second priority, determining that the first communication resources begin before the time instant and in response to determining that the first priority is higher than the second priority and that the first communication resources begin before the time instant, selecting the first subset of the third uplink communication resources such that the start of the first subset occurs at the time of the start of the third uplink communication resources.

Paragraph 9. A method according to paragraph 7, the method comprising determining that the first priority is higher than the second priority, determining that the first communication resources begin after the time instant and in response to determining that the first priority is higher than the second priority and that the first communication resources begin after the time instant, selecting the first subset of the third uplink communication resources such that the end of the first subset occurs at the time of the end of the third uplink communication resources.

Paragraph 10. A method according to any of paragraphs 1 to 9, wherein independently encoding the first control information and the second control information comprises encoding the first control information at a first encoding rate and encoding the second control information at a second encoding rate.

Paragraph 11. A method according to paragraph 10, the method comprising determining the first encoding rate based on the first priority, and determining the second encoding rate based on the second priority, Paragraph 12. A method according to paragraph 10 or paragraph 11, the method comprising one or both of the steps of determining the first encoding rate based on the selected first subset of the third uplink communication resources, and determining the second encoding rate based on the selected second subset of the third uplink communication resources.

Paragraph 13. A method according to paragraph 11 or paragraph 12, wherein the second encoding rate is higher than a coding rate which would have been used to transmit the second control information using the second uplink communication resources.

Paragraph 14. A method according to any of paragraphs 1 to 13, the method comprising determining that the first priority is higher than the second priority and in response to determining that the first priority is higher than the second priority and before the encoding of the second control information, reducing the amount of the second control information.

Paragraph 15. A method according to paragraph 14, wherein the second control information comprises acknowledgement information and reducing the amount of the second control information comprises applying one or more logical functions to a first number of bits of the acknowledgement information to generate a second number of bits lower than the first number of bits.

Paragraph 16. A method according to paragraph 15, wherein the one or more logical functions comprise an 'AND' function.

Paragraph 17. A method according to any of paragraphs 14 to 16, the method comprising determining that a capacity of the third uplink communication resources is not sufficient to transmit the first control information and the second control information, wherein reducing the amount of the second control information before encoding the second control information is in response to determining that the capacity of the third uplink communication resources is not sufficient.

Paragraph 18. A method according to any of paragraphs 1 to 17, the method comprising determining a first transmit power based on the first priority, and determining a second transmit power based on the second priority, wherein transmitting the encoded first control information using the first subset of the third uplink communication resources and the encoded second control information using the second subset of the third uplink communication resources comprises transmitting the encoded first control information at the first transmit power and transmitting the encoded second control information at the second transmit power.

Paragraph 19. A method according to paragraph 18, wherein if the first priority is higher than the second priority, the first transmit power is higher than the second transmit power.

Paragraph 20. A method according to any of paragraphs 1 to 19, wherein the third communication resources comprise a plurality of resource elements of a wireless access interface divided in time into time periods and comprising a plurality of subcarriers, each resource element corresponding to a single subcarrier for the duration of a single time period.

Paragraph 21. A method according to paragraph 20, wherein the first subset comprises resource elements in each of two or more time periods.

Paragraph 22. A method according to paragraph 20 or paragraph 21, wherein the first subset comprises resource elements on each of two or more subcarriers.

Paragraph 23. A method according to paragraph 22, wherein the first subset comprises resource elements on a first group of subcarriers during a first group of time periods and resource elements on a second group of subcarriers during a second group of time periods, the second group of subcarriers being different from the first group of subcarriers, and the second group of time periods being different from the first group of time periods.

Paragraph 24. A method according to any of paragraphs 20 to 23, wherein a single time period corresponds to an orthogonal frequency division multiplexing (OFDM) symbol period.

Paragraph 25. A method according to any of paragraphs 1 to 24, the method comprising receiving an indication of one or more rules for selecting the first subset of communication resources, the indication transmitted by the infrastructure equipment, wherein the selecting the first subset of the third uplink communication resources is in accordance with the rules.

Paragraph 26. A method according to any of paragraphs 1 to 25, wherein one or more of the selecting the third uplink communication resources, selecting the first subset of the third uplink communication resources and selecting the second subset of the third uplink communication resources is based on the first and second priorities.

Paragraph 27. A method according to any of paragraphs 1 to 26, wherein the first control information comprises acknowledgement information associated with respective data transmitted using two or more instances of downlink communication resources.

Paragraph 28. A method according to paragraph 27, wherein the two or more instances of downlink communication resources were allocated in accordance with a semi-persistent scheduling scheme.

Paragraph 29. A method according to paragraph 27, wherein the two or more instances of downlink communication resources were allocated by means of dynamic grants.

Paragraph 30. A method according to any of paragraphs 1 to 29, the method comprising selecting a third subset of the third uplink communication resources for the transmission of third control information, independently encoding the third control information, and transmitting to the infrastructure equipment the encoded third control information using the third subset of the third uplink communication resources.

Paragraph 31. A method of transmitting control information by a communications device, the method comprising selecting third uplink communication resources for the transmission of first control information having a first priority and second control information having a second priority different from the first priority, determining a time instant, the time instant being after the start of the third communication resources and before the end of the third communication resources, determining that first uplink communication resources allocated for the transmission of the first control information begin after the time instant and selecting a first subset of the third uplink communication resources such that the end of the first subset occurs at the time of the end of the third uplink communication resources, determining that the transmission of the first control information using the first subset of the third uplink communication resources is incompatible with capabilities of the communications device, and in response to determining that the transmission of the first control information using the first subset of the third uplink communication resources is incompatible with the capabilities of the communications device, transmitting the first control information using the first uplink communication resources allocated for the transmission of the first control information.

Paragraph 32. A method according to paragraph 31, the method comprising receiving an allocation of the first uplink communication resources for transmitting the first control information, receiving an allocation of second uplink communication resources for transmitting the second control information, and determining that the second uplink communication resources collide with the first uplink communication resources.

Paragraph 33. A method according to paragraph 31 or paragraph 32, the method comprising determining that the first priority is higher than the second priority, wherein selecting the first subset of the third uplink communication resources is based on the first priority.

Paragraph 34. A method of receiving control information, the method comprising transmitting an allocation of first uplink communication resources for transmitting first control information having a first priority, transmitting an allocation of second uplink communication resources for transmitting second control information having a second priority different from the first priority, determining that the second uplink communication resources collide with the first uplink communication resources, receiving encoded first control information transmitted using a first subset of third uplink communication resources and encoded second control information transmitted using a second subset of the third uplink communication resources, the first and second control information being independently encoded, and decoding the first control information and the second control information.

Paragraph 35. A method of receiving control information, the method comprising transmitting to a communications device an allocation of first uplink communication resources for a transmission by the communications device of first control information having a first priority, transmitting an allocation of second uplink communication resources for a transmission by the communications device of second control information having a second priority different from the first priority, determining that the second uplink communication resources collide with the first uplink communication resources, determining third uplink communication resources for the transmission of the first control information and the second control information, determining a time instant, the time instant being after the start of the third communication resources and before the end of the third communication resources, determining that the first uplink communication resources begin after the time instant, identifying a first subset of the third uplink communication resources such that the end of the first subset occurs at the time of the end of the third uplink communication resources, determining that a transmission of the first control information using the first subset of the third uplink communication resources is incompatible with capabilities of the communications device, and in response to determining that the transmission of the first control information using the first subset of the third uplink communication resources is incompatible with the capabilities of the communications device, receiving the first control information using the first uplink communication resources.

Paragraph 36. A communications device for operating in a wireless communications network, the communications device comprising a transmitter configured to transmit signals on a wireless access interface provided by an infrastructure equipment of the wireless communications network, a receiver configured to receive signals on the wireless access interface, and a controller configured to control the transmitter and the receiver so that the communications device is operable to select third uplink communication resources for the transmission of first control information having a first priority and second control information having a second priority different from the first priority, to select a first subset of the third uplink communication resources for the transmission of the first control information, to select a second subset of the third uplink communication resources for the transmission of the second control information, to independently encode the first control information and the second control information, and to transmit to an infrastructure equipment the encoded first control information using the first subset of the third uplink communication resources and the encoded second control information using the second subset of the third uplink communication resources.

Paragraph 37. Circuitry for a communications device for operating in a wireless communications network, the circuitry comprising transmitter circuitry configured to transmit signals on a wireless access interface provided by an infrastructure equipment of the wireless communications network, receiver circuitry configured to receive signals on the wireless access interface, and controller circuitry configured to control the transmitter circuitry and the receiver circuitry so that the communications device is operable to select third uplink communication resources for the transmission of first control information having a first priority and second control information having a second priority different from the first priority, to select a first subset of the third uplink communication resources for the transmission of the first control information, to select a second subset of the third uplink communication resources for the transmission of the second control information, to independently encode the first control information and the second control information, and to transmit to an infrastructure equipment the encoded first control information using the first subset of the third uplink communication resources and the encoded second control information using the second subset of the third uplink communication resources.

Paragraph 38. A communications device for operating in a wireless communications network, the communications device comprising a transmitter configured to transmit signals on a wireless access interface provided by an infrastructure equipment of the wireless communications network, a receiver configured to receive signals on the wireless access interface, and a controller configured to control the transmitter and the receiver so that the communications device is operable to select third uplink communication resources for the transmission of first control information having a first priority and second control information having a second priority different from the first priority, to determining a time instant, the time instant being after the start of the third communication resources and before the end of the third communication resources, to determine that first uplink communication resources allocated for the transmission of the first control information begin after the time instant and to select a first subset of the third uplink communication resources such that the end of the first subset occurs at the time of the end of the third uplink communication resources, to determine that the transmission of the first control information using the first subset of the third uplink communication resources is incompatible with capabilities of the communications device, and in response to determining that the transmission of the first control information using the first subset of the third uplink communication resources is incompatible with the capabilities of the communications device, to transmit the first control information using the first uplink communication resources allocated for the transmission of the first control information.

Paragraph 39. Circuitry for a communications device for operating in a wireless communications network, the circuitry comprising transmitter circuitry configured to transmit signals on a wireless access interface provided by an infrastructure equipment of the wireless communications network, receiver circuitry configured to receive signals on the wireless access interface, and controller circuitry configured to control the transmitter circuitry and the receiver circuitry so that the communications device is operable to select third uplink communication resources for the transmission of first control information having a first priority and second control information having a second priority different from the first priority, to determining a time instant, the time instant being after the start of the third communication resources and before the end of the third communication resources, to determine that first uplink communication resources allocated for the transmission of the first control information begin after the time instant and to select a first subset of the third uplink communication resources such that the end of the first subset occurs at the time of the end of the third uplink communication resources, to determine that the transmission of the first control information using the first subset of the third uplink communication resources is incompatible with capabilities of the communications device, and in response to determining that the transmission of the first control information using the first subset of the third uplink communication resources is incompatible with the capabilities of the communications device, to transmit the first control information using the first uplink communication resources allocated for the transmission of the first control information.

Paragraph 40. Infrastructure equipment for use in a wireless communications network, the infrastructure equipment providing a wireless access interface, the infrastructure equipment comprising a transmitter configured to transmit signals via the wireless access interface, a receiver configured to receive signals, and a controller configured to control the transmitter and the receiver so that the infrastructure equipment is operable to transmit an allocation of first uplink communication resources for transmitting first control information having a first priority, to transmit an allocation of second uplink communication resources for transmitting second control information having a second priority different from the first priority, to determine that the second uplink communication resources collide with the first uplink communication resources, to receive encoded first control information transmitted using a first subset of third uplink communication resources and encoded second control information transmitted using a second subset of the third uplink communication resources, the first and second control information being independently encoded, and to decode the first control information and the second control information.

Paragraph 41. Circuitry for infrastructure equipment for use in a wireless communications network, the infrastructure equipment providing a wireless access interface, the circuitry comprising transmitter circuitry configured to transmit signals via the wireless access interface, receiver circuitry configured to receive signals, and controller circuitry configured to control the transmitter circuitry and the receiver circuitry so that the infrastructure equipment is operable to transmit an allocation of first uplink communication resources for transmitting first control information having a first priority, to transmit an allocation of second uplink communication resources for transmitting second control information having a second priority different from the first priority, to determine that the second uplink communication resources collide with the first uplink communication resources, to receive encoded first control information transmitted using a first subset of third uplink communication resources and encoded second control information transmitted using a second subset of the third uplink communication resources, the first and second control information being independently encoded, and to decode the first control information and the second control information.

Paragraph 42. Infrastructure equipment for use in a wireless communications network, the infrastructure equipment providing a wireless access interface, the infrastructure equipment comprising a transmitter configured to transmit signals via the wireless access interface, a receiver configured to receive signals, and a controller configured to control the transmitter and the receiver so that the infrastructure equipment is operable to transmit to a communications device an allocation of first uplink communication resources for a transmission by the communications device of first control information having a first priority, to transmit an allocation of second uplink communication resources for a transmission by the communications device of second control information having a second priority different from the first priority, to determine that the second uplink communication resources collide with the first uplink communication resources, to determine third uplink communication resources for the transmission of the first control information and the second control information, to determine a time instant, the time instant being after the start of the third communication resources and before the end of the third communication resources, to determine that the first uplink communication resources begin after the time instant, to identify a first subset of the third uplink communication resources such that the end of the first subset occurs at the time of the end of the third uplink communication resources, to determine that a transmission of the first control information using the first subset of the third uplink communication resources is incompatible with capabilities of the communications device, and in response to determining that the transmission of the first control information using the first subset of the third uplink communication resources is incompatible with the capabilities of the communications device, to receive the first control information using the first uplink communication resources.

Paragraph 43. Circuitry for infrastructure equipment for use in a wireless communications network, the infrastructure equipment providing a wireless access interface, the circuitry comprising transmitter circuitry configured to transmit signals via the wireless access interface, receiver circuitry configured to receive signals, and controller circuitry configured to control the transmitter circuitry and the receiver circuitry so that the infrastructure equipment is operable to transmit to a communications device an allocation of first uplink communication resources for a transmission by the communications device of first control information having a first priority, to transmit an allocation of second uplink communication resources for a transmission by the communications device of second control information having a second priority different from the first priority, to determine that the second uplink communication resources collide with the first uplink communication resources, to determine third uplink communication resources for the transmission of the first control information and the second control information, to determine a time instant, the time instant being after the start of the third communication resources and before the end of the third communication resources, to determine that the first uplink communication resources begin after the time instant, to identify a first subset of the third uplink communication resources such that the end of the first subset occurs at the time of the end of the third uplink communication resources, to determine that a transmission of the first control information using the first subset of the third uplink communication resources is incompatible with capabilities of the communications device, and in response to determining that the transmission of the first control information using the first subset of the third uplink communication resources is incompatible with the capabilities of the communications device, to receive the first control information using the first uplink communication resources.

Further particular and preferred aspects of the present invention are set out in the accompanying independent and dependent claims. It will be appreciated that features of the dependent claims may be combined with features of the independent claims in combinations other than those explicitly set out in the claims.

REFERENCES

[1] 3GPP TS 38.300 v. 15.2.0 "NR; NR and NG-RAN Overall Description; Stage 2 (Release 15)", June 2018

[2] Holma H. and Toskala A, "LTE for UMTS OFDMA and SC-FDMA based radio access", John Wiley and Sons, 2009

[3] 3GPP TR 38.913, "Study on Scenarios and Requirements for Next Generation Access Technologies (Release 14)", v14.3.0

[4] 3GPP Tdoc RP-190726, "Physical layer enhancements for NR ultra-reliable and low latency communication (URLLC)," Huawei, HiSilicon, RAN #83

[5] 3GPP Tdoc RP-201310, "Revised WID: Enhanced Industrial Internet of Things (IoT) and ultra-reliable and low latency communication (URLLC) support for NR," Nokia, Nokia Shanghai Bell, RAN #88e

[6] 3GPP TR 38.825, "Study on NR Industrial Internet of Things (IoT)," 3GPP Rel-16.

[7] 3GPP Tdoc RP-182090, "Revised SID: Study on NR Industrial Internet of Things (IoT)," RAN #81.

What is claimed is:

1. A method of transmitting control information, the method comprising:

receiving allocations of first uplink communication resources and second uplink communication resources for transmission of first control information having a first priority and second control information having a second priority different from the first priority;

determining that the second uplink communication resources collide with the first uplink communication resources;

in response to determining that the second and the first uplink communication resources collide, selecting third uplink communication resources for transmission of both the first control information and the second control information;

reducing an amount of the second control information based on a determination that a capacity of the third uplink communication resources is not sufficient to transmit both the first control information and the second control information, wherein reducing the amount of the second control information further comprises applying one or more logical functions to a first number of bits of the second control information to generate a second number of bits that is lower than the first number of bits;

selecting a first subset of the third uplink communication resources for the transmission of the first control information;

selecting a second subset of the third uplink communication resources for the transmission of the second control information;

independently encoding the first control information and the second control information; and transmitting to an infrastructure equipment the encoded first control information using the first subset of the third uplink communication resources and the encoded second control information using the second subset of the third uplink communication resources.

2. The method according to claim 1, wherein;

the third uplink communication resources is the first uplink communication resources.

3. The method according to claim 1, wherein:

selecting the third uplink communication resources comprises selecting, as the third uplink communication resources, the first uplink communication resources if a capacity of the first uplink communication resources is greater than a capacity of the second communication resources.

4. The method according to claim 1, wherein;

selecting the third uplink communication resources comprises selecting, as the third uplink communication resources, the first uplink communication resources if the first priority is higher than the second priority.

5. The method according to claim 1, wherein;

selecting the third uplink communication resources comprises selecting, as the third uplink communication resources, the first uplink communication resources if a time at which the first uplink communication resources ends is earlier than a time at which the second uplink communication resources ends.

6. The method according to claim 1, the method comprising:

determining a time instant, the time instant being after the start of the third communication resources and before the end of the third communication resources.

7. The method according to claim 6, the method comprising:

determining that the first priority is higher than the second priority, determining that the first uplink communication resources begin before the time instant and in response to determining that the first priority is higher than the second priority and that the first uplink communication resources begin before the time instant, selecting the first subset of the third uplink communication resources such that the start of the first subset occurs at the time of the start of the third uplink communication resources.

8. The method according to claim 6, the method comprising:

determining that the first priority is higher than the second priority, determining that the first uplink communication resources begin after the time instant and in response to determining that the first priority is higher than the second priority and that the first uplink communication resources begin after the time instant, selecting the first subset of the third uplink communication resources such that the end of the first subset occurs at the time of the end of the third uplink communication resources.

9. The method according to claim 1, wherein;

independently encoding the first control information and the second control information comprises encoding the first control information at a first encoding rate and encoding the second control information at a second encoding rate.

10. The method according to claim 9, the method comprising:

determining the first encoding rate based on the first priority, and determining the second encoding rate based on the second priority.

11. The method according to claim 10, wherein;

the second encoding rate is higher than a coding rate which would have been used to transmit the second control information using the second uplink communication resources.

12. The method according to claim 9, the method comprising one or both of the steps of:

determining the first encoding rate based on the selected first subset of the third uplink communication resources, and determining the second encoding rate based on the selected second subset of the third uplink communication resources.

13. The method according to claim 1, the method comprising:

determining that the first priority is higher than the second priority, and in response to determining that the first priority is higher than the second priority and before the encoding of the second control information, reducing the amount of the second control information.

14. The method according to claim 13, wherein;

the second control information comprises acknowledgement information and reducing the amount of the second control information comprises applying the one or more logical functions to a first number of bits of the acknowledgement information to generate a second number of bits of the acknowledgement information lower than the first number of bits.

15. The method according to claim 14, wherein:

the one or more logical functions comprise an 'AND' function.

16. The method according to claim 1, the method comprising:

determining a first transmit power based on the first priority, and determining a second transmit power based on the second priority, wherein transmitting the encoded first control information using the first subset of the third uplink communication resources and the encoded second control information using the second subset of the third uplink communication resources comprises transmitting the encoded first control information at the first transmit power and transmitting the encoded second control information at the second transmit power.

17. The method according to claim 1, wherein selecting the first subset of the third uplink communication resources and selecting the second subset of the third uplink communication resources further comprises:

providing a non-contiguous allocation of resources to one of the first subset and the second subset by separating the allocated resources in at least one of time or frequency to provide at least one of time diversity or frequency diversity.

18. A communications device for operating in a wireless communications network, the communications device comprising:

circuitry configured to transmit signals on a wireless access interface provided by an infrastructure equipment of the wireless communications network;

receive signals on the wireless access interface; and control the circuitry configured to transmit the signals and to receive the signals so that the communications device is operable to receive allocations of first uplink communication resources and second uplink communication resources for transmission of first control information having a first priority and second control information having a second priority different from the first priority;

to determine that the second uplink communication resources collide with the first uplink communication resources:

in response to determining that the second and the first uplink communication resources collide, to select third uplink communication resources for transmission of both the first control information and the second control information;

to reduce an amount of the second control information based on a determination that a capacity of the third uplink communication resources is not sufficient to transmit both the first control information and the second control information, wherein reducing the amount of the second control information further comprises applying one or more logical functions to a first number of bits of the second control information to generate a second number of bits that is lower than the first number of bits:

to select a first subset of the third uplink communication resources for the transmission of the first control information;

to select a second subset of the third uplink communication resources for the transmission of the second control information;

to independently encode the first control information and the second control information; and to transmit to an infrastructure equipment the encoded first control information using the first subset of the third uplink communication resources and the encoded second control information using the second subset of the third uplink communication resources.

19. The communications device according to claim 18, wherein to select the first subset of the third uplink communication resources and to select the second subset of the third uplink communication resources further comprises:

providing a non-contiguous allocation of resources to one of the first subset and the second subset by separating the allocated resources in at least one of time or frequency to provide at least one of time diversity or frequency diversity.

20. Infrastructure equipment for use in a wireless communications network, the infrastructure equipment providing a wireless access interface, the infrastructure equipment comprising:

circuitry configured to transmit signals via the wireless access interface;

receive signals; and control the circuitry configured to transmit the signals and to receive the signals so that the infrastructure equipment is operable to transmit an allocation of first uplink communication resources for transmitting first control information having a first priority;

to transmit an allocation of second uplink communication resources for transmitting second control information having a second priority different from the first priority;

to determine that the second uplink communication resources collide with the first uplink communication resources;

in response to determining that the second and the first uplink communication resources collide, to select third uplink communication resources for transmission of both the first control information and the second control information;

to reduce an amount of the second control information based on a determination that a capacity of the third uplink communication resources is not sufficient to transmit both the first control information and the second control information, wherein reducing the amount of the second control information further comprises applying one or more logical functions to a first number of bits of the second control information to generate a second number of bits that is lower than the first number of bits;

to receive encoded first control information transmitted using a first subset of third uplink communication resources and encoded second control information transmitted using a second subset of the third uplink communication resources, the first and second control information being independently encoded; and to decode the first control information and the second control information.

* * * * *